US010578500B2

(12) United States Patent
Kawai et al.

(10) Patent No.: US 10,578,500 B2
(45) Date of Patent: Mar. 3, 2020

(54) FORCE DETECTING DEVICE AND ROBOT

(71) Applicant: Seiko Epson Corporation, Tokyo (JP)

(72) Inventors: Hiroki Kawai, Matsumoto (JP);
Yoshiteru Nishimura, Shiojiri (JP)

(73) Assignee: Seiko Epson Corporation (JP)

( * ) Notice: Subject to any disclaimer, the term of this patent is extended or adjusted under 35 U.S.C. 154(b) by 108 days.

(21) Appl. No.: 15/879,935

(22) Filed: Jan. 25, 2018

(65) Prior Publication Data

US 2018/0217013 A1 Aug. 2, 2018

(30) Foreign Application Priority Data

Jan. 27, 2017 (JP) .................. 2017-013481

(51) Int. Cl.
| | | |
|---|---|---|
| G01L 1/16 | (2006.01) | |
| B25J 13/08 | (2006.01) | |
| G01L 5/00 | (2006.01) | |
| G01L 5/16 | (2006.01) | |
| G01L 5/22 | (2006.01) | |
| G01L 5/166 | (2020.01) | |

(52) U.S. Cl.
CPC ............... *G01L 1/16* (2013.01); *B25J 13/085* (2013.01); *G01L 5/0061* (2013.01); *G01L 5/166* (2013.01); *G01L 5/226* (2013.01); *Y10S 901/46* (2013.01)

(58) Field of Classification Search
CPC . G01L 1/16; G01L 5/166; G01L 5/226; G01L 5/0061; B25J 13/085; Y10S 901/46
See application file for complete search history.

(56) References Cited

U.S. PATENT DOCUMENTS

| | | | | |
|---|---|---|---|---|
| 4,092,854 A | * | 6/1978 | Henry | .................... G01L 5/164 73/862.041 |
| 4,138,884 A | * | 2/1979 | Ruoff, Jr. | ............... G01L 5/164 73/862.041 |
| 4,573,362 A | * | 3/1986 | Amlani | ................. G01L 1/2218 73/862.044 |
| 4,640,138 A | * | 2/1987 | Meyer | .................... G01L 5/226 73/862.044 |
| 4,821,584 A | * | 4/1989 | Lembke | ................ B25J 19/063 310/338 |
| 4,836,034 A | * | 6/1989 | Izumi | .................... G01L 1/2231 73/862.044 |
| 4,911,023 A | * | 3/1990 | Izumi | .................... G01L 1/2231 73/862.044 |
| 5,821,432 A | * | 10/1998 | Sidler | .................... G01L 5/167 73/862.043 |
| 6,550,346 B2 | * | 4/2003 | Gombert | ................. G01L 5/166 250/208.6 |
| 7,594,445 B2 | * | 9/2009 | Hirabayashi | ............. G01L 1/26 73/862.041 |

(Continued)

FOREIGN PATENT DOCUMENTS

JP 2015-071214 A 4/2015

*Primary Examiner* — Jonathan M Dunlap
(74) *Attorney, Agent, or Firm* — Harness, Dickey & Pierce, P.L.C.

(57) ABSTRACT

A force detecting device attachable to a robot including an arm includes a first base including a projection having an attachment surface to which an end effector is attachable, a second base attached to the arm, and at least one piezoelectric element supported between the first base and the second base and configured to detect external forces applied to the first base and the second base.

18 Claims, 14 Drawing Sheets

(56) References Cited

U.S. PATENT DOCUMENTS

| | | | | |
|---|---|---|---|---|
| 8,661,918 B2* | 3/2014 | Ohta | ............... | B25J 13/085 73/1.08 |
| 2004/0123676 A1* | 7/2004 | Karasawa | ............... | G01L 5/161 73/862.045 |
| 2012/0215357 A1* | 8/2012 | Igarashi | ............... | B25J 9/1641 700/258 |
| 2013/0112010 A1* | 5/2013 | Matsumoto | ............... | B25J 19/028 73/862.044 |
| 2013/0200644 A1* | 8/2013 | Shiomi | ............... | B25J 15/00 294/207 |
| 2015/0100160 A1 | 4/2015 | Arai | | |
| 2015/0120051 A1* | 4/2015 | Matsuzawa | ............... | H01L 41/1132 700/258 |
| 2015/0120052 A1* | 4/2015 | Mizushima | ............... | B25J 19/028 700/258 |
| 2015/0127159 A1* | 5/2015 | Kamiya | ............... | G01P 15/18 700/258 |
| 2015/0239126 A1* | 8/2015 | Matsuzawa | ............... | B25J 9/1694 700/258 |
| 2015/0266184 A1* | 9/2015 | Arakawa | ............... | G01L 5/167 700/258 |
| 2016/0354167 A1* | 12/2016 | Arimitsu | ............... | A61B 34/30 |
| 2016/0356657 A1* | 12/2016 | Stansloski | ............... | G01L 1/18 |
| 2019/0060019 A1* | 2/2019 | Maret | ............... | A61B 5/6847 |

* cited by examiner

| | EXPECTED VALUE | OUTPUT VALUE |
|---|---|---|
| Fx | 0 | Fx |
| Fy | 0 | 0 |
| Fz | M | M |
| Mx | 0 | 0 |
| My | TM | TM |
| Mz | 0 | 0 |

FORCE DETECTING DEVICE AND ROBOT

BACKGROUND

1. Technical Field

The present invention relates to a force detecting device and a robot.

2. Related Art

In an industrial robot including an end effector and a robot arm, a force detecting device that detects a force applied to the end effector has been used.

As an example of the force detecting device, for example, JP-A-2015-71214 (Patent Literature 1) discloses a force sensor. The force sensor is provided between a robot arm and a finger unit functioning as an end effector included in a robot. The overall shape of the force sensor is cylindrical. The upper end face of the force sensor is flat. The entire region of the upper end face of the force sensor is fixed to the finger unit. The upper end face of the force sensor functions as a pressure receiving surface that receives an external force generated by, for example, contact of the finger unit with an object.

In the force sensor described in Patent Literature 1, when an external force is applied onto the center axis (an axis that passes the center of the pressure receiving surface) of the force sensor, the other axis output (an output in an axial direction in which the external force is not applied) by the force sensor is small. Therefore, when a contact part of the finger unit with the object is located on the center axis of the force sensor, the robot can accurately perform work on the object with the finger unit on the basis of a detection result of the force sensor.

However, in the force sensor described in Patent Literature 1, when an external force is applied to a position deviating from the center axis of the force sensor, the other axis output by the force sensor increases. Therefore, when the contact part of the finger unit on the object deviates from the center axis of the force sensor, an external force not originally applied is apparently applied to the force sensor. In this case, it is difficult for the robot to carry out highly accurate work based on a detection result of the force sensor in the same manner as when the contact part of the finger unit on the object is located on the center axis of the force sensor.

SUMMARY

An advantage of some aspects of the invention is to solve at least a part of the problems described above, and the invention can be implemented as the following configurations.

A force detecting device according to an aspect of the invention is a force detecting device attachable to a robot including an arm, the force detecting device including: a first base including a projection having an attachment surface to which an end effector is attachable; a second base attached to the arm; and at least one piezoelectric element supported between the first base and the second base and configured to detect external forces applied to the first base and the second base.

With the force detecting device according to the aspect of the invention, even if an external force is applied to a position deviating from the center axis of the force detecting device, it is possible to reduce the other axis output (an output in an axial direction in which the external force is not applied). It is possible to improve detection accuracy of the external force by the force detecting device. Therefore, with the force detecting device according to the aspect, it is possible to improve the detection accuracy of the external force by the force detecting device both when the external force is applied to the position deviating from the center axis of the force detecting device and when the external force is applied to the position on the center axis of the force detecting device.

In the force detecting device according to the aspect of the invention, it is preferable that the force detecting device includes a plurality of the piezoelectric elements.

With this configuration, it is possible to achieve improvement of sensitivity of the force detecting device and realize an increase of detection axes.

In the force detecting device according to the aspect of the invention, it is preferable that the force detecting device further includes a plurality of sensor devices held by the first base and the second base and including the at least one piezoelectric element, and, when viewed from a normal direction of the attachment surface, the projection is located further on an inner side than the plurality of sensor devices.

With this configuration, even when the external force is applied to the position deviating from the center axis of the force detecting device, it is possible to further reduce the other axis output and further improve the detection accuracy of the external force by the force detecting device.

In the force detecting device according to the aspect of the invention, it is preferable that the first base includes a recess on an opposite side of the projection.

With this configuration, it is possible to achieve a reduction in the weight of the first base, further reduce the other axis output, and further improve the detection accuracy of the external force by the force detecting device.

In the force detecting device according to the aspect of the invention, it is preferable that the first base includes a first wall configured to pressurize the piezoelectric element, and the second base includes a second wall configured to pressurize the piezoelectric element.

With this configuration, it is possible to apply a constant pressure to the piezoelectric element in advance and further improve the detection accuracy of the external force by the force detecting device.

In the force detecting device according to the aspect of the invention, it is preferable that the piezoelectric element includes quartz.

With this configuration, it is possible to realize the force detecting device having excellent characteristics such as high sensitivity, a wide dynamic range, and high rigidity.

In the force detecting device according to the aspect of the invention, it is preferable that the force detecting device further includes a through-hole opened in the first base and the second base.

With this configuration, it is possible to insert flexible members (tubes, etc.) including wires or pipes through the through-hole. Therefore, when an end effector is used as the member to be attached, it is possible to efficiently draw around wires or the like of the end effector from the robot arm to the end effector via the through-hole of the force detecting device.

In the force detecting device according to the aspect of the invention, it is preferable that the second base is configured to enable an adapter for attaching the second base to the arm to be connected to the second base.

With this configuration, it is possible to easily attach the second base to an appropriate position of the arm via the adapter. Therefore, it is possible to further improve the detection accuracy of the external force by the force detecting device attached to the arm.

In the force detecting device according to the aspect of the invention, it is preferable that a work part of the end effector deviates from a normal of the attachment surface that passes a center of the attachment surface.

Even when the end effector is used, with the force detecting device according to the aspect, it is possible to reduce the other axis output and improve detection accuracy of the external force.

A robot according to an aspect of the invention includes: the force detecting device according to the aspect; and an arm to which the force detecting device is attached.

With the robot, it is possible to more precisely execute work by using a detection result of the force detecting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A force detecting devices and a robot according to the invention are explained in detail below with reference to preferred embodiments shown in the accompanying drawings. Note that figures are enlarged or reduced as appropriate and shown to enable explained portions to be recognized.

First Embodiment

Robot

Figure 1:
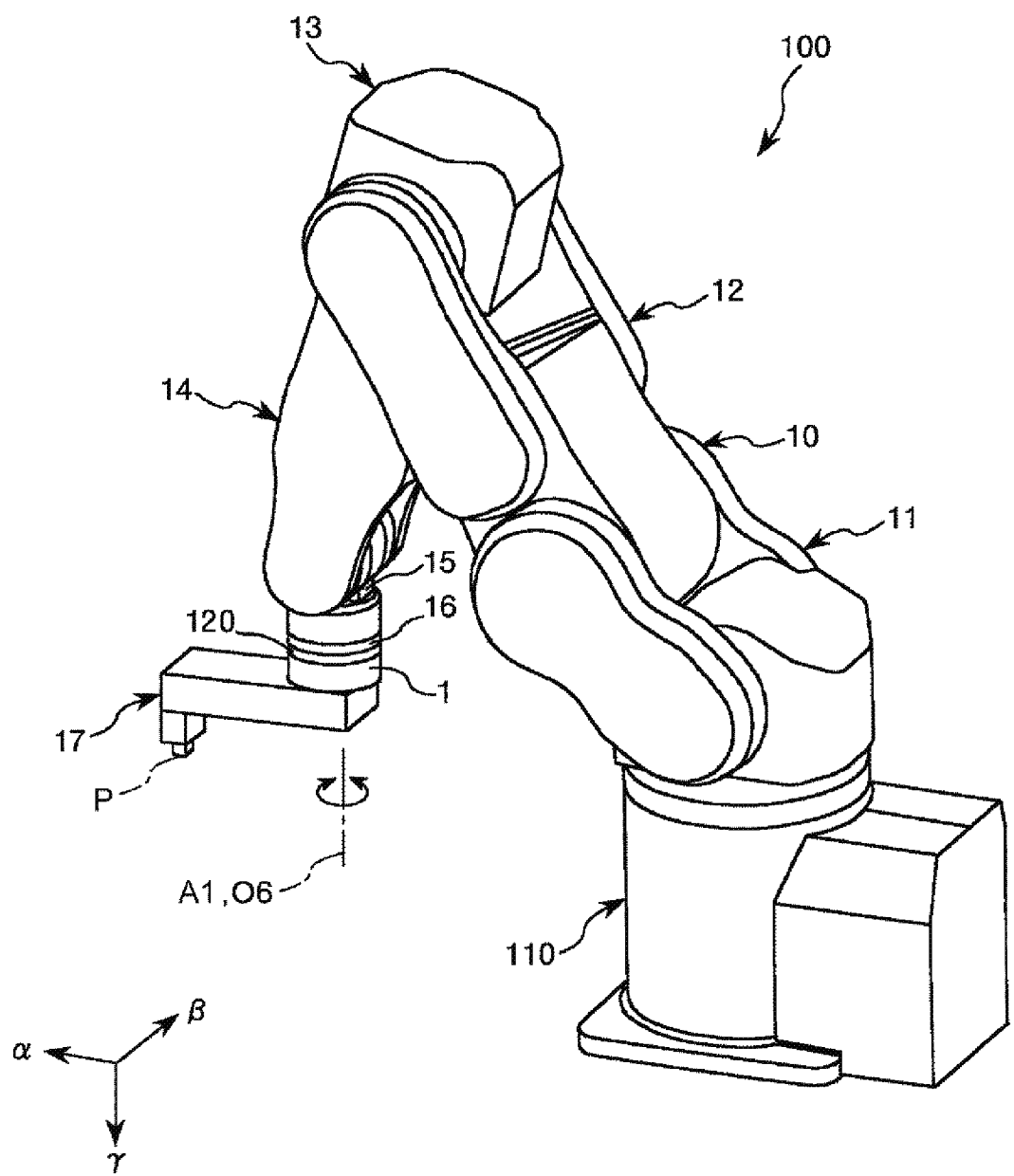
FIG. 1 is a perspective view showing a robot according to a first embodiment of the invention.

FIG. 1 is a perspective view showing a robot according to a first embodiment of the invention. Note that, in FIG. 1, for convenience of explanation, an $\alpha$ axis, a $\beta$ axis, and a $\gamma$ axis are shown as three axes orthogonal to one another. Distal end sides of arrows indicating the axes are represented as "+" and proximal end sides of the arrows are represented as "−". A direction parallel to the $\alpha$ axis is referred to as "$\alpha$-axis direction", a direction parallel to the $\beta$ axis is referred to as "$\beta$-axis direction", and a direction parallel to the $\gamma$ axis is referred to as "$\gamma$-axis direction". A +$\gamma$-axis direction side is referred to as "upper" as well and a −$\gamma$-axis direction side is referred to as "lower" as well. View from $\gamma$-axis direction is referred to as "plan view". A base 110 side in FIG. 1 is referred to as "proximal end". The opposite side of the base 110 side (an end effector 17 side) is referred to as "distal end".

A robot 100 shown in FIG. 1 can perform work such as supply, removal, conveyance, and assembly of objects such as a precision instrument and components configuring the precision instrument. The robot 100 is a single-arm robot and is a so-called six-axis vertical articulated robot. The robot 100 includes a base 110, a robot arm 10 turnably coupled to the base 110, a force detecting device 1, and an end effector 17.

The base 110 is a portion fixed to, for example, a floor, a wall, a ceiling, and a movable truck. The robot arm 10 includes an arm 11 (a first arm), an arm 12 (a second arm), an arm 13 (a third arm), an arm 14 (a fourth arm), an arm 15 (a fifth arm), and an arm 16 (a sixth arm). The arms 11 to 16 are coupled in this order from the proximal end side to the distal end side. The arms 11 to 16 are capable of rotating with respect to the arms adjacent thereto or the base 110.

The force detecting device 1 is connected to the distal end of the arm 16 by an attachment member 120 (an adapter). The force detecting device 1 has a function of detecting, for example, a force (including a moment) applied to the end effector 17 attached to the distal end of the force detecting device 1. Note that the configuration of the attachment member 120 only has to be a configuration that can attach the force detecting device 1 to the arm 16. A specific configuration of the attachment member 120 is not limited. However, the attachment member 120 desirably includes a positioning member that can attach the force detecting device 1 such that a center axis A1 (the axis) of the force detecting device 1 coincides with an axis O6 of the arm 16 (the turning axis of the arm 16). Consequently, it is possible to further improve detection accuracy of an external force by the force detecting device 1.

The end effector 17 is eccentric to the force detecting device 1. A work part P of the end effector 17, that is, a part that directly performs work on an object or the like deviates from the center axis A1 of the force detecting device 1. Note that the configuration or the like of the end effector 17 only has to have a function of directly performing work on the object or the like and is not limited to the configuration shown in the figure. For example, the end effector 17 does not have to be eccentric to the force detecting device 1.

Although not shown in the figure, the robot 100 includes a driving section including a motor that turns one arm with respect to the other arm (or the base 110). Although not shown in the figure, the robot 100 includes an angle sensor that detects a rotation angle of a rotating shaft of the motor.

The configuration of the robot 100 is briefly explained above. Note that the number of arms included in the robot 100 is six in the figure. However, the number of arms is not limited to this and may be one to five or seven or more.

The robot 100 explained above includes the force detecting device 1 and the arm 16 to which the force detecting device 1 is attached. The robot 100 includes the force detecting device 1. Therefore, for example, by feeding back an external force detected by the force detecting device 1 to a control section (not shown in the figure) having a function of controlling the robot 100, the robot 100 can more precisely execute work. The robot 100 can detect, with the external force detected by the force detecting device 1, for example, contact of the end effector 17 with an obstacle. Therefore, the robot 100 can easily perform an obstacle avoiding motion, an object damage avoiding motion, and the like. The robot 100 can more safely execute work.

The force detecting device 1 is explained below.

Force Detecting Device

Figure 2:
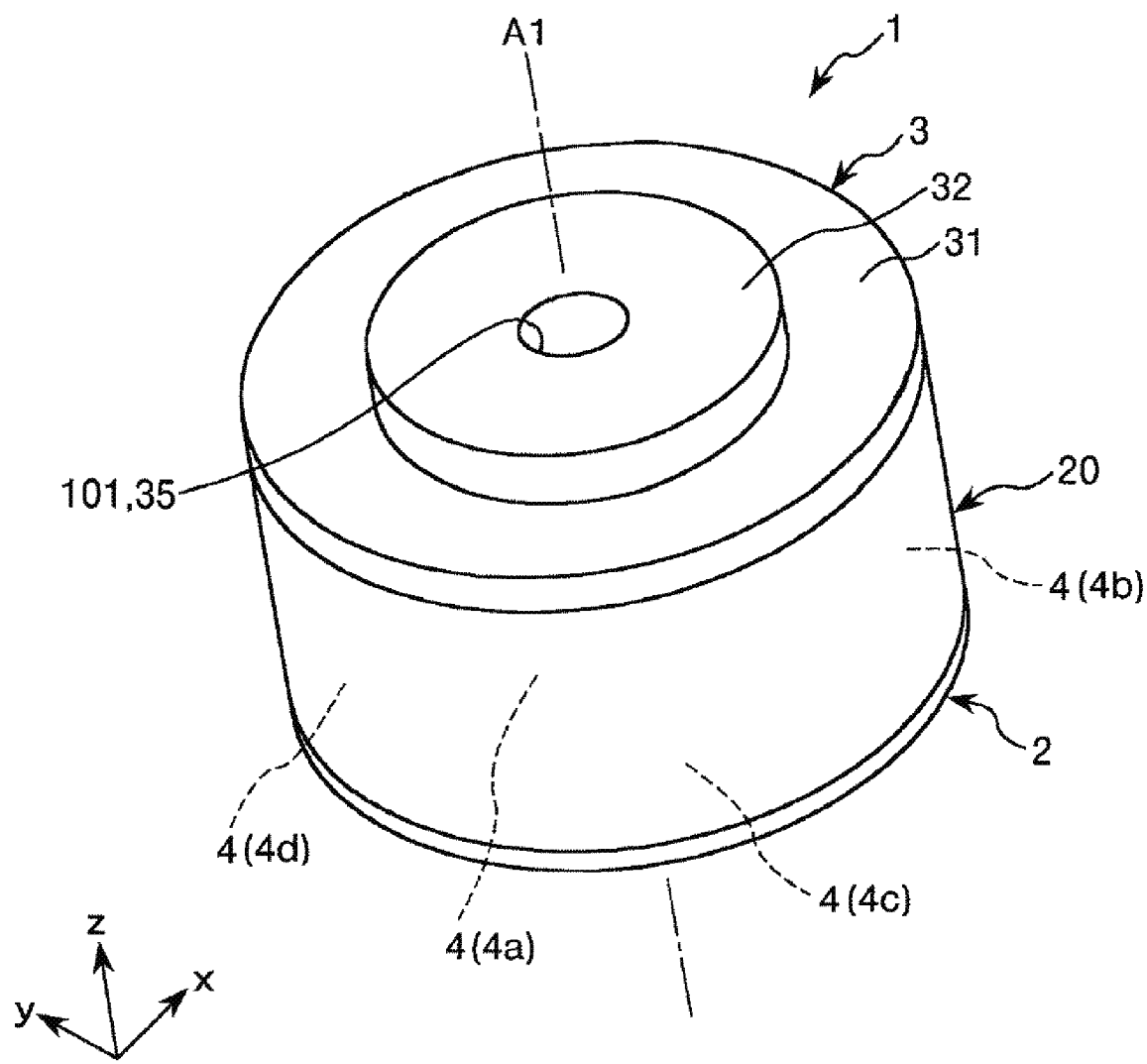
FIG. 2 is a perspective view showing a force detecting device shown in FIG. 1.
Figure 3:
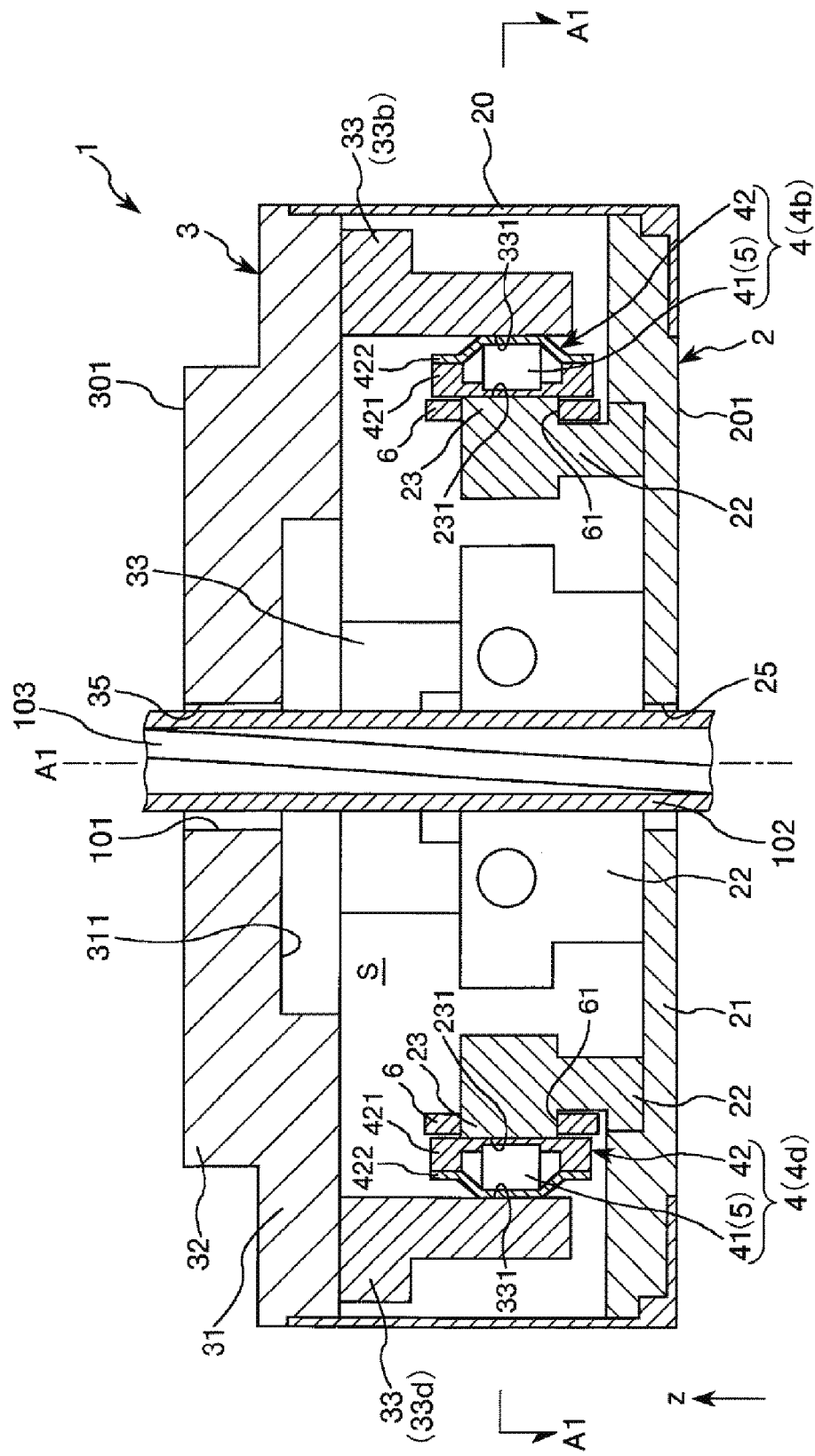
FIG. 3 is a longitudinal sectional view of the force detecting device shown in FIG. 2.
Figure 4:
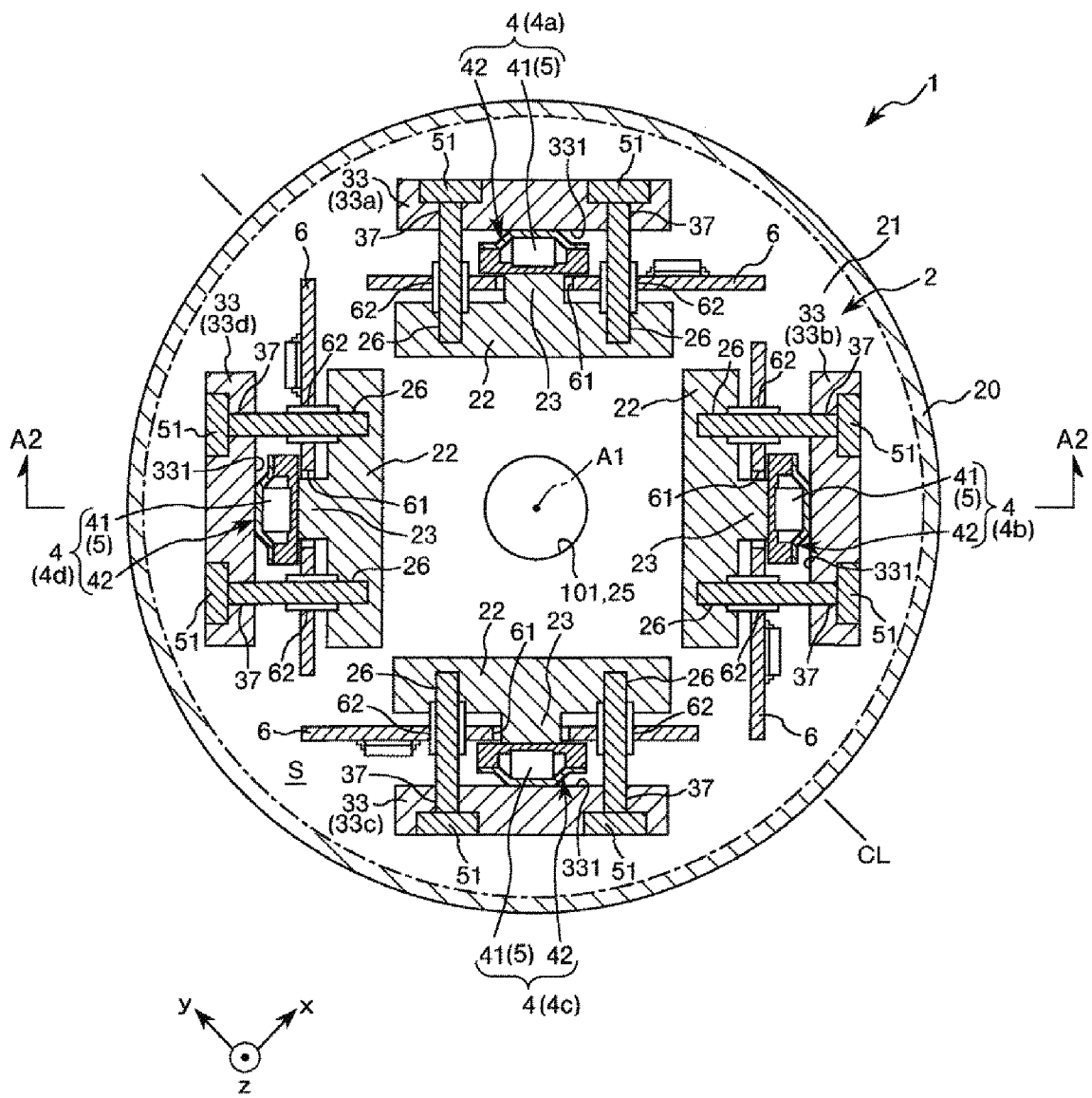
FIG. 4 is a cross sectional view of the force detecting device shown in FIG. 2.
Figure 5:
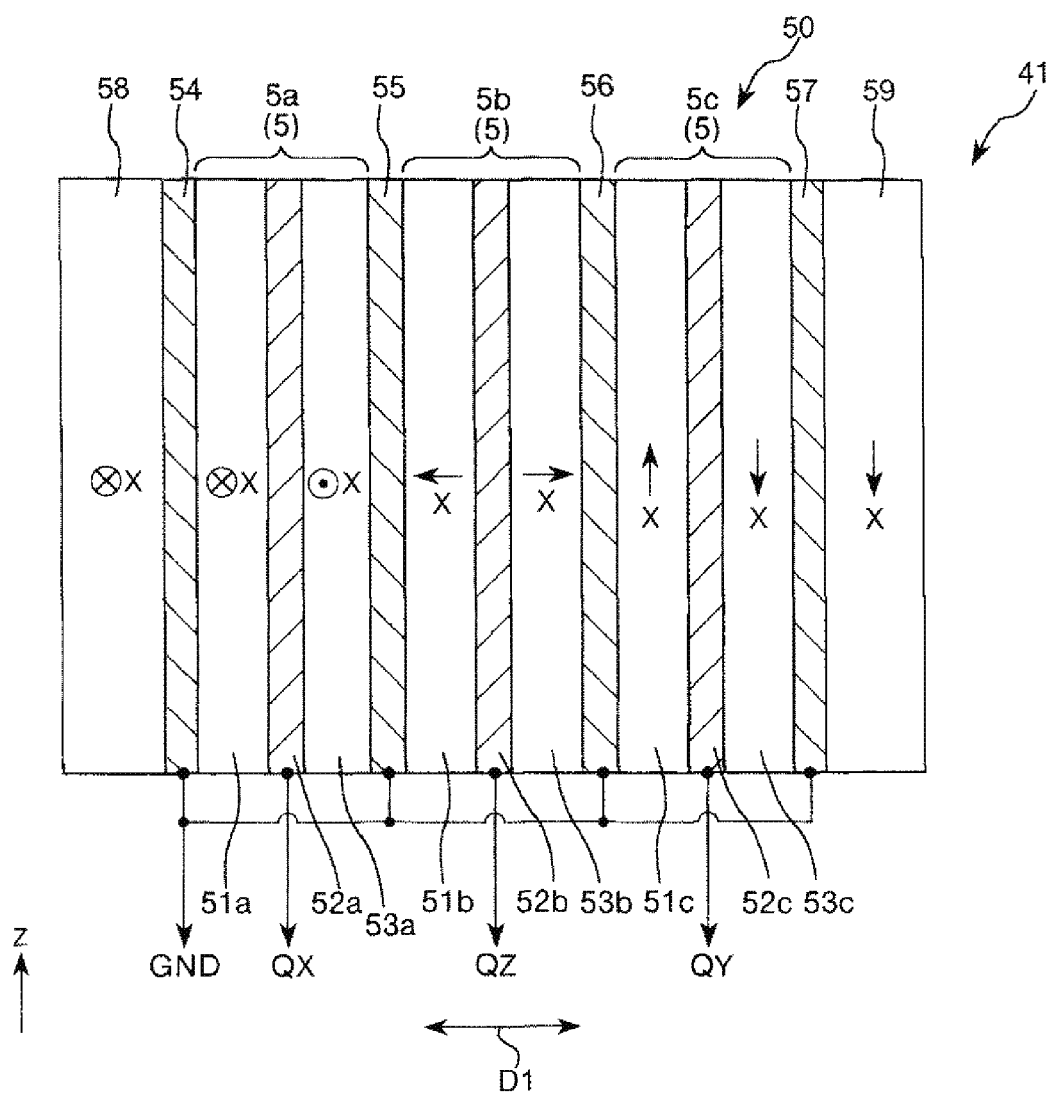
FIG. 5 is a sectional view of a force detecting element included in the force detecting device shown in FIGS. 3 and 4.

FIG. 2 is a perspective view showing the force detecting device shown in FIG. 1. FIG. 3 is a longitudinal sectional view of the force detecting device shown in FIG. 2. FIG. 4 is a cross sectional view of the force detecting device shown in FIG. 2. FIG. 5 is a sectional view of a force detecting element included in the force detecting device shown in FIGS. 3 and 4. Note that FIG. 3 is an A2-A2 line sectional view in FIG. 4. FIG. 4 is an A1-A1 line sectional view in FIG. 3. In FIGS. 2 and 4, for convenience of explanation, an x axis, a y axis, and a z axis are shown as three axes orthogonal to one another. Distal end sides of arrows indicating the axes are represented as "+" and proximal end sides of the arrows are represented as "−". A direction parallel to the x axis is referred to as "x-axis direction", a direction parallel to the y axis is referred to as "y-axis direction", and a direction parallel to the z axis is referred to as "z-axis direction". A +z-axis direction side is referred to as "upper" as well and a −z-axis direction side is referred to as "lower" as well. A view from the z-axis direction is referred to as "plan view".

The force detecting device 1 shown in FIG. 2 is a six-axis force sensor capable of detecting six-axis components of an external force applied to the force detecting device 1. The six-axis components include translational force (shearing force) components in the directions of the respective three axes (in the figure, the x axis, the y axis, and the z axis) orthogonal to one another and rotational force (moment) components around the respective three axes.

As shown in FIGS. 2 to 4, the force detecting device 1 includes a first member 3, a second member 2 disposed at an interval with respect to the first member 3, a plurality of (in this embodiment, four) sensor devices 4 disposed between the first member 3 and the second member 2, and a sidewall section 20 provided in the outer circumferential portions of the first member 3 and the second member 2. Note that, in the following explanation, among the four sensor devices 4, the sensor device 4 located on the upper side in FIG. 4 is referred to as "sensor device 4a" and the other sensor devices 4 are referred to as "sensor device 4b", "sensor device 4c", and "sensor device 4d" in clockwise order. When the sensor devices 4a, 4b, 4c, and 4d are not distinguished, the sensor devices 4a, 4b, 4c, and 4d are referred to as "sensor devices 4". As shown in FIG. 4, the force detecting device 1 includes a plurality of (in this embodiment, eight) pressurizing bolts 51 and a plurality of (in this embodiment, four) analog circuit boards 6. Although not shown in the figures, the force detecting device 1 includes a digital circuit board. As shown in FIGS. 2 to 4, the force detecting device 1 includes a through-hole 101 formed along the center axis A1 of the force detecting device 1.

In the force detecting device 1, the sensor devices 4 output signals (detection results) corresponding to received external forces. The analog circuit board 6 and a digital circuit board (not shown in the figures) process the signals. Consequently, the force detecting device 1 detects six-axis components of the external force applied to the force detecting device 1.

The force detecting device 1 is configured to be attachable to the arm 16 and the attachment member 120 (see FIG. 1). A portion (a lower surface 201) on a −z-axis side of the force detecting device 1 is attached to the arm 16 via the attachment member 120 (see FIG. 3). On the other hand, a portion (an upper surface 301) on a +z-axis side of the force detecting device 1 is attached to the end effector 17. Therefore, the force detecting device 1 shown in FIG. 3 is shown vertically oppositely to the force detecting device 1 shown in FIG. 1.

The sections included in the force detecting device 1 are explained below.

First Member

As shown in FIG. 3, the first member 3 (a first base) includes a top plate 31, a projecting section 32 (a projection) provided in the center on the upper side of the top plate 31, and a plurality of wall sections 33 (a first wall) provided on the lower side and the outer circumferential portion of the top plate 31. Note that, in the following explanation, among the four wall sections 33, the wall section 33 located on the upper side in FIG. 4 is referred to as "wall section 33a" the other wall sections 33 are referred to as "wall section 33b", "wall section 33c", and "wall section 33d" in clockwise order. When the wall sections 33a, 33b, 33c, and 33d are not distinguished, the wall sections 33a, 33b, 33c, and 33d are referred to as "wall sections 33". The external shape in plan view of the first member 3 is a circle as shown in FIG. 2. However, the external shape is not limited to this and may be, for example, a polygon such as a square or a pentagon or an ellipse. The first member 3 includes, in the center of the first member 3, a through-hole 35 formed along the center axis A1. The through-hole 35 pierces through the projecting section 32 in the center of the projecting section 32.

As shown in FIG. 3, the top plate 31 is a substantially flat shape. A recessed section 311 (a recess) is formed on the lower surface (a surface on the second member 2 side) of the top plate 31. The recessed section 311 is provided in the center of the top plate 31 in plan view. The external shape in plan view of the recessed section 311 is a circular shape similar to the external shape in plan view of the top plate 31. Since the first member 3 includes the recessed section 311, it is possible to achieve a reduction in the weight of the first member 3 and reduce the other axis output (an output in an axial direction in which an external force is not applied) of the force detecting device 1. Note that the recessed section 311 is explained below.

On the upper side of the top plate 31, the projecting section 32 projecting upward (a direction opposite to the second member 2) from the top plate 31 is provided. In the figure, the projecting section 32 is formed integrally with the top plate 31. Consequently, the number of components is reduced. It is possible to achieve a reduction in the thickness of the first member 3. Note that the projecting section 32 may be formed by a member separate from the top plate 31.

As shown in FIG. 2, the projecting section 32 is provided in the center of the top plate 31 in plan view. In the figure, the external shape in plan view of the projecting section 32 is a circle similar to the external shape in plan view of the top plate 31. However, the external shape is not limited to this and may be, for example, a polygon such as a square or a pentagon or an ellipse. Since the first member 3 includes the projecting section 32, it is possible to reduce the other axis output (an output in an axial direction in which an external force is not applied) of the force detecting device 1. Note that the projecting section 32 is explained below.

As shown in FIG. 3, under the top plate 31, the plurality of (in this embodiment, four) wall sections 33 are erected toward the opposite side of the projecting section 32. Note that, in the figure, the wall sections 33 are formed by members separate from the top plate 31 and fixed to the top plate 31. However, the wall sections 33 may be formed integrally with the top plate 31. As shown in FIG. 4, the plurality of wall sections 33 are arranged at equal angle (90°) intervals from one another along the same circumference centering on the center axis A1 of the force detecting device 1. A plurality of through-holes 37, through which pressurizing bolts 51 explained below are inserted, are formed in the wall sections 33. As shown in FIG. 3, inner wall surfaces 331 (end faces on the inner sides) of the wall sections 33 are planes perpendicular to the top plate 31.

The upper surface 301 of the projecting section 32 included in the first member 3 including such a configuration functions as an attachment surface for attaching the force detecting device 1 to the end effector 17 (a member to be attached) of the robot 100.

A constituent material of the first member 3 is not particularly limited. Examples of the constituent material include metal materials such as aluminum and stainless steel and ceramics.

Second Member

As shown in FIG. 3, the second member 2 (a second base) includes a bottom plate 21 and a plurality of wall sections 22 (a second wall) provided on the upper side of the bottom plate 21. The external shape in plan view of the second member 2 is a circle as shown in FIG. 2. However, the external shape is not limited to this and may be, for example, a polygon such as a square or a pentagon or an ellipse. As shown in FIG. 3, the second member 2 includes, in the center of the second member 2, a through-hole 25 formed along the center axis A1.

The bottom plate 21 is a substantially flat shape. On the upper side of the bottom plate 21, the plurality of (in this embodiment, four) wall sections 22 are erected toward the first member 3 side. Note that, in the figure, the wall sections 22 are formed by members separate from the bottom plate 21 and fixed to the bottom plate 21. However, the wall sections 22 may be formed integrally with the bottom plate 21. As shown in FIG. 4, the plurality of wall sections 22 are arranged at equal angle (90°) intervals from one another along the same circumference centering on the center axis A1 of the force detecting device 1. The wall sections 22 are disposed on the center axis A1 side with respect to the wall sections 33 of the first member 3 explained above and are opposed to the wall sections 33. On the wall section 33 side of the wall section 22, the wall section 22 includes a portion 23 projecting toward the wall section 33 side. A top surface 231 of the projecting portion 23 is opposed to the inner wall surface 331 of the wall section 33 at an interval of a predetermined distance (a distance for enabling insertion of the sensor device 4). The top surface 231 and the inner wall surface 331 are parallel. In the wall sections 33, a plurality of female screw holes 26, in which the distal end portions of the pressurizing bolts 51 explained below are screwed, are formed.

The lower surface 201 of the second member 2 functions as an arm attachment surface for attaching the force detecting device 1 to the arm 16. The second member 2 (specifically, the lower surface 201) is configured to enable the attachment member 120, which attaches the second member 2 to the arm 16, to be connected to the second member 2. A specific configuration and the like of the second member 2 are not particularly limited. For example, although not shown in the figure, the lower surface 201 of the second member 2 can be configured to include a through-hole (a female screw hole) used to attach the lower surface 201 to the attachment plate 120 by screwing, bolting, or the like or can be configured to include an engaging section such as a hook or an L-shaped groove. Consequently, it is possible to easily attach the second member 2 to an appropriate position of the arm 16 via the attachment member 120. Therefore, it is possible to further improve the detection accuracy of an external force by the force detecting device 1 attached to the arm 16.

A constituent material of the second member 2 is not particularly limited. Like the first member 3 explained above, examples of the constituent material include metal materials such as aluminum and stainless steel and ceramics. Note that the constituent material of the second member 2 may be the same as or may be different from the constituent material of the first member 3.

Sidewall Section

As shown in FIG. 2, the sidewall section 20 is a cylindrical shape. The upper end portion and the lower end portion of the sidewall section 20 are respectively fixed to the first member 3 and the second member 2 by, for example, screwing or fitting. As shown in FIG. 3, the plurality of sensor devices 4 are housed in a space S surrounded by the sidewall section 20, the top plate 31 of the first member 3, and the bottom plate 21 of the second member 2, that is, an internal space of the force detecting device 1.

A constituent material of the sidewall section 20 is not particularly limited. Like the first member 3 and the second member 2 explained above, examples of the constituent material include metal materials such as aluminum and stainless steel and ceramics. Note that the constituent material of the sidewall section 20 may be the same as or may be different from the constituent materials of the first member 3 and the second member 2.

Sensor Device

The sensor devices 4 include, as shown in FIG. 3, force detecting elements 41 and packages 42 that house the force detecting elements 41. The sensor devices 4 are disposed between the wall section 33 of the first member 3 and the wall section 22 of the second member 2. The force detecting element includes at least one (a plurality of) piezoelectric element(s) 5.

Package

The package 42 includes abase section 421 including, on the inner side of the base section 421, a recessed section in which the force detecting element 41 is set and a lid body 422 joined to the base section 421. The recessed section of the base section 421 is sealed by the lid body 422. Consequently, it is possible to protect the force detecting element 41. The base section 421 is in contact with the top surface 231 of the second member 2 explained above. On the other hand, the lid body 422 is in contact with the inner wall surface 331 of the first member 3 explained above.

A constituent material of the base section 421 of the package 42 is not particularly limited. For example, metal materials such as Kovar (an Fe—Ni—Co alloy) and ceramics can be used. A constituent material of the lid body 422 is not particularly limited. For example, metal materials such as Kovar can be used. Note that the constituent material of the base section 421 and the constituent material of the lid body 422 may be the same or may be different. In this embodiment, the shape in plan view of the package 42 is a square. However, the shape is not limited to this and may be, for example, another polygon such as a pentagon, a circle, or an ellipse.

Force Detecting Element

The force detecting element 41 shown in FIG. 5 has a function of outputting an electric charge QX corresponding to a component in the x-axis direction of an external force applied to the force detecting element 41, an electric charge QY corresponding to a component in the y-axis direction of the external force applied to the force detecting element 41, and an electric charge QZ corresponding to a component in the z-axis direction of the external force applied to the force detecting element 41. The force detecting element 41 includes a piezoelectric element 5a that outputs the electric charge QX according to an external force (a shearing force) parallel to the x axis, a piezoelectric element 5b that outputs the electric charge QZ according to an external force (a compression/tensile force) parallel to the z axis, a piezoelectric element 5c that outputs the electric charge QY according to an external force (a shearing force) parallel to the y axis, and ground electrode layers 54, 55, 56, and 57 electrically connected to a reference potential, for example, a ground potential (GND). The force detecting element 41 includes supporting substrates 58 and 59 (dummy substrates) that support a structure 50 including the piezoelectric elements 5a, 5b, and 5c and the ground electrode layers 54, 55, 56, and 57. The supporting substrate 58, the ground electrode layer 54, the piezoelectric element 5a, the ground electrode layer 55, the piezoelectric element 5b, the ground electrode layer 56, the piezoelectric element 5c, the ground electrode layer 57, and the supporting substrate 59 are stacked in this order. Note that, in the following explanation, the piezoelectric elements 5a, 5b, and 5c are respectively referred to as "piezoelectric elements 5" as well.

The piezoelectric element 5a is configured by stacking a piezoelectric layer 51a, an output electrode layer 52a, and a piezoelectric layer 53a in this order. Similarly, the piezoelectric element 5b includes piezoelectric layers 51b and 53b and an output electrode layer 52b disposed between the piezoelectric layers 51b and 53b. The piezoelectric element 5c includes piezoelectric layers 51c and 53c and an output electrode layer 52c disposed between the piezoelectric layers 51c and 53c.

The piezoelectric element 5 includes quartz. That is, the piezoelectric element 5 includes piezoelectric layers 51a, 53a, 51b, 53b, 51c, and 53c configured by quartz. Consequently, it is possible to realize the force detecting device 1 having excellent characteristics such as high sensitivity, a wide dynamic range, and high rigidity.

As shown in FIG. 5, in the piezoelectric layers 51a, 53a, 51b, 53b, 51c, and 53c, directions of X axes, which are crystal axes of the quartz configuring the piezoelectric layers, are different. That is, the X axis of the quartz configuring the piezoelectric layer 51a faces the depth side of the paper surface in FIG. 5. The X axis of the quartz configuring the piezoelectric layer 53a faces the near side of the paper surface in FIG. 5. The X axis of the quartz configuring the piezoelectric layer 51b faces the left side in FIG. 5. The X axis of the quartz configuring the piezoelectric layer 53b faces the right side in FIG. 5. The X axis of the quartz configuring the piezoelectric layer 51c faces the upper side in FIG. 5. The X axis of the quartz configuring the piezoelectric layer 53c faces the lower side in FIG. 5. The piezoelectric layers 51a, 53a, 51c, and 53c are respectively configured by Y-cut quartz plates. The directions of the X axes are different from one another by 90°. The piezoelectric layers 51b and 53b are respectively configured from X-cut quartz plates. The directions of the X axes are different from each other by 180°.

Note that, in this embodiment, the piezoelectric layers 51a, 53a, 51b, 53b, 51c, and 53c are respectively configured by the quartz. However, the piezoelectric layers 51a, 53a, 51b, 53b, 51c, and 53c may be configured using a piezoelectric material other than the quartz. Examples of the piezoelectric material other than the quartz include topaz, barium titanate, lead titanate, lead zirconate titanate (PZT: $Pb(Zr,Ti)O_3$), lithium niobate, and lithium tantalate.

The materials configuring the output electrode layers 52a, 52b, and 52c and the ground electrode layers 54, 55, 56, and 57 are not respectively particularly limited as long as the materials can function as electrodes. Examples of the materials include nickel, gold, titanium, aluminum, copper, iron, chrome or an alloy including these kinds of metal. One kind of these materials can be used or two or more kinds of these materials can be used in combination (e.g., stacked). The output electrode layers 52a, 52b, and 52c and the ground electrode layers 54, 55, 56, and 57 are electrically connected to the analog circuit board 6 via not-shown wires, terminals, and the like (e.g., wires configured by silver paste or the like).

In this embodiment, the supporting substrates 58 and 59 are respectively configured by quartz. The supporting substrate 58 is configured by a quartz plate (a Y-cut quartz plate) having the same configuration as the configuration of the piezoelectric layer 51a adjacent to the supporting substrate 58. The direction of the X axis is also the same as the direction of the X axis of the piezoelectric layer 51a. The supporting substrate 59 is configured by a quartz plate (a Y-cut quartz plate) having the same configuration as the configuration of the piezoelectric layer 53c adjacent to the supporting substrate 59. The direction of the X axis is also the same as the direction of the X axis of the piezoelectric layer 53c. Since the quartz has anisotropy, coefficients of thermal expansion are different in the x-axis direction, the y-axis direction, and the z-axis direction. Therefore, the supporting substrates 58 and 59 desirably have the same configuration and the same arrangement (direction) as the configuration and the arrangement of the piezoelectric layers adjacent to the supporting substrates 58 and 59 in order to suppress stress due to thermal expansion.

The thicknesses of the supporting substrates 58 and are respectively larger than the thicknesses of the piezoelectric layers 51a, 53a, 51b, 53b, 51c, and 53c.

Since the force detecting element 41 includes the supporting substrates 58 and 59, the force detecting element 41 can be stably joined (connected) to the package 42. Even when the package 42 is configured by a member having electric conductivity such as a metal material, it is possible to avoid short-circuit with the not-shown wires, terminals, and the like.

Note that the supporting substrates 58 and 59 may be respectively configured using materials not having electric conductivity other than quartz.

The force detecting element 41 is explained above. As explained above, the force detecting element 41 includes the plurality of piezoelectric elements 5. Consequently, it is possible to achieve improvement of sensitivity of the force detecting device 1 and achieve an increase of detection axes.

Note that the numbers of piezoelectric elements and piezoelectric layers configuring the force detecting element 41 are not limited to the numbers described above. For example, the number of piezoelectric layers included in one piezoelectric element may be one or three or more or the number of piezoelectric elements may be two or four or more.

A plan-view shape of the force detecting element 41 is the square in the figure. However, the plan-view shape is not limited to this and may be, for example, another polygon such as a pentagon, a circle, or an ellipse.

The sensor devices 4 explained above are disposed such that a stacking direction D1 of the piezoelectric elements 5a, 5b, and 5c included in the force detecting element 41 is orthogonal to the center axis A1 (in a plane direction of a yz plane) (see FIGS. 3 and 5). As shown in FIG. 4, when viewed from a direction along the center axis A1, the four sensor devices 4 are disposed to be symmetrical with respect to a line segment CL that passes the center axis A1 and is parallel to the y axis. The sensor devices 4 are located in an intermediate part between the top plate 31 of the first member 3 and the bottom plate 21 of the second member 2 when viewed from a direction orthogonal to the center axis A1 (in the side view of FIG. 3). In this embodiment, for example, the ground electrode layer 57 is located on the wall section 22 side and the ground electrode layer 54 is located on the wall section 33 side.

In this embodiment, clearances between the sensor devices 4 (the force detecting elements 41) and the center axis A1 are equal. Clearances between the sensor devices 4 (the force detecting elements 41) and the geometrical center of the upper surface 301 are equal. Clearances between the sensor devices 4 (the force detecting elements 41) and the geometrical center of the lower surface 201 are equal. Note that the equality of the clearances includes errors of mechanical design, setting, and the like.

Pressurizing Bolts (Fixing Members)

The plurality of pressurizing bolts 51 fix the wall section 33 of the first member 3 and the wall section 22 of the second member 2 to each other in a state in which the sensor device 4 (more specifically, the plurality of piezoelectric elements 5) are held by the wall section 33 and the wall section 22 (see FIGS. 3 and 4). The pressurizing bolts 51 are inserted through the through-holes 37 of the wall section 33 from the wall section 33 side. Male screws formed at the distal end portions of the pressurizing bolts 51 are screwed in female screws formed in the wall section 22. With the plurality of pressurizing bolts 51, the force detecting element 41 can be held and pressurized by the inner wall surface 331 of the first member 3 and the top surface 231 of the second member 2 via the package 42 of the sensor device 4. By adjusting fastening forces of the pressurizing bolts 51 as appropriate, it is possible to apply, to the force detecting element 41, as pressurization, pressure in the stacking direction D1 of the piezoelectric elements 5 having predetermined magnitude (see FIG. 5).

A constituent material of the pressurizing bolts 51 is not particularly limited. Examples of the constituent material include various metal materials. Note that the positions and the number of the pressurizing bolts 51 are respectively not limited to the positions and the number shown in the figure. The number of the pressurizing bolts 51 may be, for example, one or three or more with respect to one sensor device 4. The force detecting element 41 including the piezoelectric elements 5 is held between the first member 3 and the second member 2 (in particular, between the wall section 33 and the wall section 22). However, the force detecting element 41 is not limited to this and only has to be supported in any configuration between the first member 3 and the second member 2.

Analog Circuit Board

As shown in FIG. 3, the analog circuit board 6 is disposed in the space S, that is, between the first member 3 and the second member 2. In the analog circuit board 6, a through-hole 61, through which the projecting portion 23 of the second member 2 is inserted, and through-holes 62, through which the pressurizing bolts 51 are inserted, are formed (see FIGS. 3 and 4). The analog circuit board 6 is disposed on the center axis A1 side with respect to the sensor device 4 in a state in which the analog circuit board 6 is inserted through the portion 23. Consequently, it is possible to provide the analog circuit board 6 near the sensor device 4 and reduce a wiring length from the sensor device 4. Therefore, it is possible to contribute to simplification of structure.

The analog circuit board 6 is electrically connected to the sensor device 4. Although not shown in the figure, the analog circuit board 6 includes a charge amplifier (a conversion output circuit) that converts the electric charges Q (QX, QY, and QZ) output from the force detecting element 41 of the sensor device 4 respectively into voltages V (VX, VY, and VZ). The charge amplifier can include, for example, an operational amplifier, a capacitor, and a switching element.

Digital Circuit Board

Although not shown in the figure, the digital circuit board can be provided, for example, on the second member 2. The digital circuit board is electrically connected to the analog circuit board 6. Although not shown in the figure, the digital circuit board includes an external-force detection circuit that detects (calculates) an external force on the basis of the voltages VX, VY, and VZ output from the analog circuit board 6. The external-force detection circuit calculates a translational force component Fx in the x-axis direction, a translational force component Fy in the y-axis direction, a translational force component Fz in the z-axis direction, a rotational force component Mx around the x axis, a rotational force component My around the y axis, and a rotational force component Mz around the z axis. The external-force detection circuit can include, for example, an AD converter and an arithmetic circuit such as a CPU connected to the AD converter.

In this embodiment, the sensor devices 4 are disposed such that the stacking direction D1 of the piezoelectric elements 5 is orthogonal to the center axis A1. The four sensor devices 4 are disposed to be symmetrical with respect to the line segment CL (see FIGS. 4 and 5). As explained above, pressurization is applied in the direction parallel to the stacking direction D1 of the piezoelectric elements 5 by the wall section 33 and the wall section 22. Therefore, in the digital circuit board, it is possible to calculate the translational force components Fx, Fy, and Fz and the rotational force components Mx, My, and Mz without using the electric charge QZ that is easily affected by temperature fluctuation. Therefore, the force detecting device 1 is less easily affected by fluctuation in temperature and capable of performing highly accurate detection. Consequently, for example, it is possible to reduce or eliminate a situation in which the force detecting device 1 is placed under a high-temperature environment, the first member 3 and the second member 2 thermally expand, and the pressurization on the piezoelectric elements 5 changes from a predetermined value to be a noise component because of the thermal expansion.

The basic configuration of the force detecting device 1 is explained above. In the force detecting device 1, as explained above, the first member 3 includes the wall section 33 functioning as a "first pressurizing section" that pressurizes the piezoelectric elements 5 (the force detecting element 41) and the second member 2 includes the wall section 22 functioning as a "second pressurizing section" that pressurizes the piezoelectric elements 5 (the force detecting element 41). In this embodiment, the first member 3 and the second member 2 are fixed by the pressurizing bolts 51. Consequently, it is possible to apply a constant pressure to the pressurizing elements 5 in advance and further improve the detection accuracy of an external force by the force detecting device 1.

As explained above, the first member 3 includes the through-hole 35 formed along the center axis A1. The second member 2 includes the through-hole 25 formed along the center axis A1. The through-hole 101 is configured by the through-hole 35 and the through-hole 25 and a columnar space (a columnar space, the length of which is equal to the thickness in the z-axis direction of the force detecting device 1) that causes the through-hole 35 and the through-hole 25 to communicate in the space S. That is, the force detecting device 1 includes the through-hole 101 opened in the first member 3 and the second member 2. In this embodiment, the through-hole 101 is formed along the center axis A1. Consequently, it is possible to insert a flexible member (a cable, etc.) including, for example, a wire or a pipe through the through-hole 101. Therefore, for example, it is possible to efficiently draw around a wire 103 of the end effector 17 (a member to be attached) from the base 110 of the robot 100 to the end effector 17 via the through-hole 101 of the force detecting device 1 (see FIGS. 1 and 3).

As shown in FIG. 3, a cylindrical tube 102 (a buffer member) is provided on the inside of the through-hole 101. The tube 102 is connected to, for example, the attachment member 120 or the end effector 17 (see FIGS. 1 and 3). In this embodiment, the outer circumferential surface of the tube 102 is separated from wall surfaces that form the through-holes 25 and 35. Note that the tube 102 does not have to be separated from the wall surfaces as long as the tube 102 is located in the through-hole 101. The tube 102 has a function of a position restricting member that restricts the position of the wire 103 to prevent the wire 103 from coming into contact with the inner wall of the through hole 101. Therefore, it is possible to reduce or prevent misdetection of the force detecting device 1 due to the contact of the wire 103 with the inner wall.

The wire 103 can be disposed on the inside of the robot arm 10 and in the tube 102 of the force detecting device 1. Therefore, the wire 103 does not have to be disposed on the outside of the robot arm 10 and the outside of the force detecting device 1. Therefore, it is possible to reduce an unnecessary external force applied to the force detecting device 1 when the wire 103 disposed on the outside of the force detecting device 1 collides with the force detecting device 1 according to a movement of the robot arm 10.

Note that the shape of the tube 102 is not limited to the columnar shape. The shape of the tube 102 may be any shape as long as the tube 102 functions as the position restricting member.

The other axis output of the force detecting device 1 can be reduced by providing the projecting section 32 of the first member 3. This is explained together with problems in a force detecting device 1a in the past.

Figure 6:
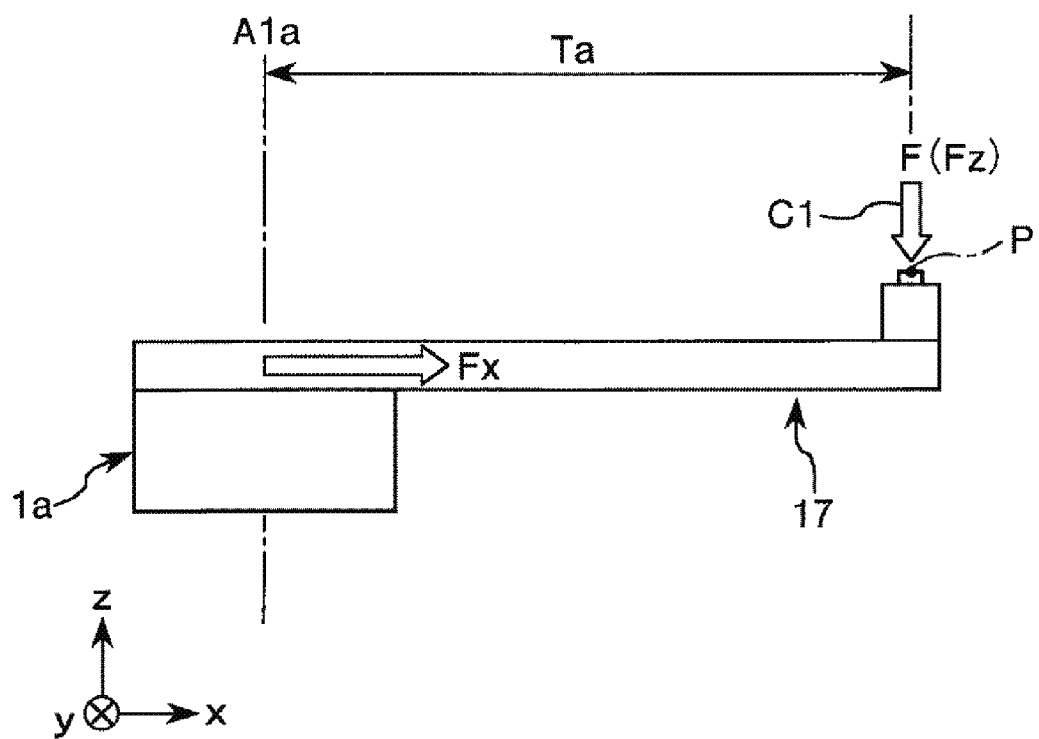
FIG. 6 is a side view schematically showing a state in which a force detecting device having a configuration in the past is attached to an end effector.
Figures 7, 8:
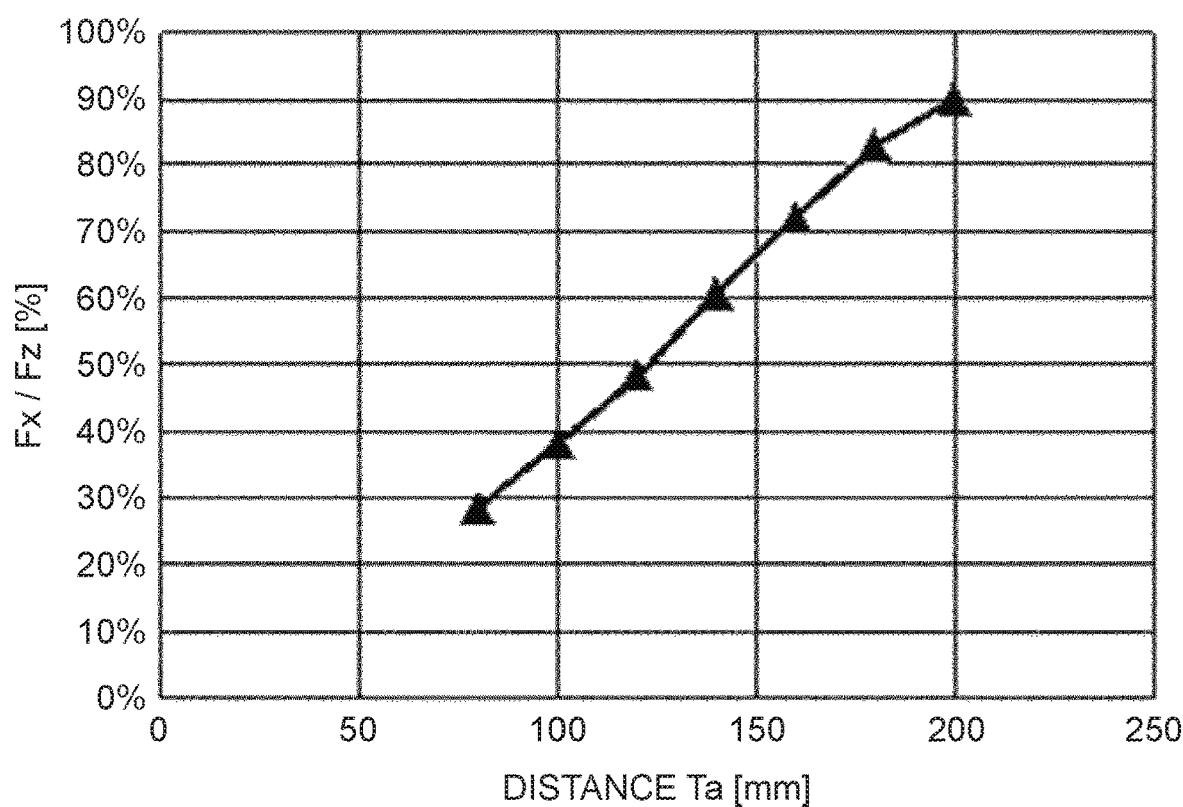
FIG. 7 is a diagram showing a relation between an expected value and an actual output value at the time when an external force is applied in the force detecting device shown in FIG. 6.
FIG. 8 is a diagram showing a relation between a distance Ta and a ratio Fx/Fz in the force detecting device shown in FIG. 6.

FIG. 6 is a side view schematically showing a state in which a force detecting device having a configuration in the past is attached to an end effector. FIG. 7 is a diagram showing a relation between an expected value and an actual output value at the time when an external force is applied in the force detecting device shown in FIG. 6. FIG. 8 is a diagram showing a relation between a distance Ta and a ratio Fx/Fz in the force detecting device shown in FIG. 6.

The upper surface (a surface on the upper side in FIG. 6) of the force detecting device 1a shown in FIG. 6 is flat. The entire region of the upper surface of the force detecting device 1a is fixed in contact with the end effector 17. For example, when an object comes into contact with the work part P of the end effector 17 and an external force F in an arrow C1 direction is applied to the work part P, it is assumed that the rotational force component My is detected by the force detecting device 1 together with the translational force component Fz (see a column of an expected value in FIG. 7). For example, it is assumed that the translational force component Fy having magnitude TM corresponding to magnitude M and the distance Ta is detected together with the translational force component Fz having the magnitude M. The distance Ta is a distance between a center axis A1a and the work part P. However, in the force detecting device 1a, actually, the translational force component Fx is detected together with the translational force component Fz and the rotational force component My (see a column of an output value in FIG. 7). This is considered to be because the rotation center around the y axis of a force applied to the force detecting device 1a deviates from the center of the sensor device included in the force detecting element 41 and a force not originally applied to the sensor device included in the force detecting device 1a is excessively applied to the sensor device. As the work part P, to which the external force F is applied, further separates from the center axis A1a, as shown in FIG. 8, the magnitude of the translational force component Fx tends to increase.

In this way, when the external force F is applied to the work part P in a position deviating from the center axis A1a, in the force detecting device 1a in the past, the other axis output (in the example shown in FIG. 6, the translational force component Fx) increases. Therefore, when work is performed using the end effector 17 or the like eccentric to the force detecting device 1a, a force not originally applied to the force detecting device 1a is apparently applied to the force detecting device 1a. Even if the other axis output is corrected by, for example, a digital circuit board, the other axis output is too large and cannot be sufficiently corrected. Therefore, when the eccentric end effector 17 is used, it is difficult to perform, on the basis of a detection result of the force detecting device 1a in the past, the same work as work performed using a non-eccentric end effector.

Therefore, the force detecting device 1 in this embodiment includes the first member 3 including the projecting section 32 as explained above in order to reduce the other axis output (see FIG. 2). The other axis output can be reduced by providing the projecting section 32. This is explained mainly with reference to FIGS. 9 to 11.

Figure 9:
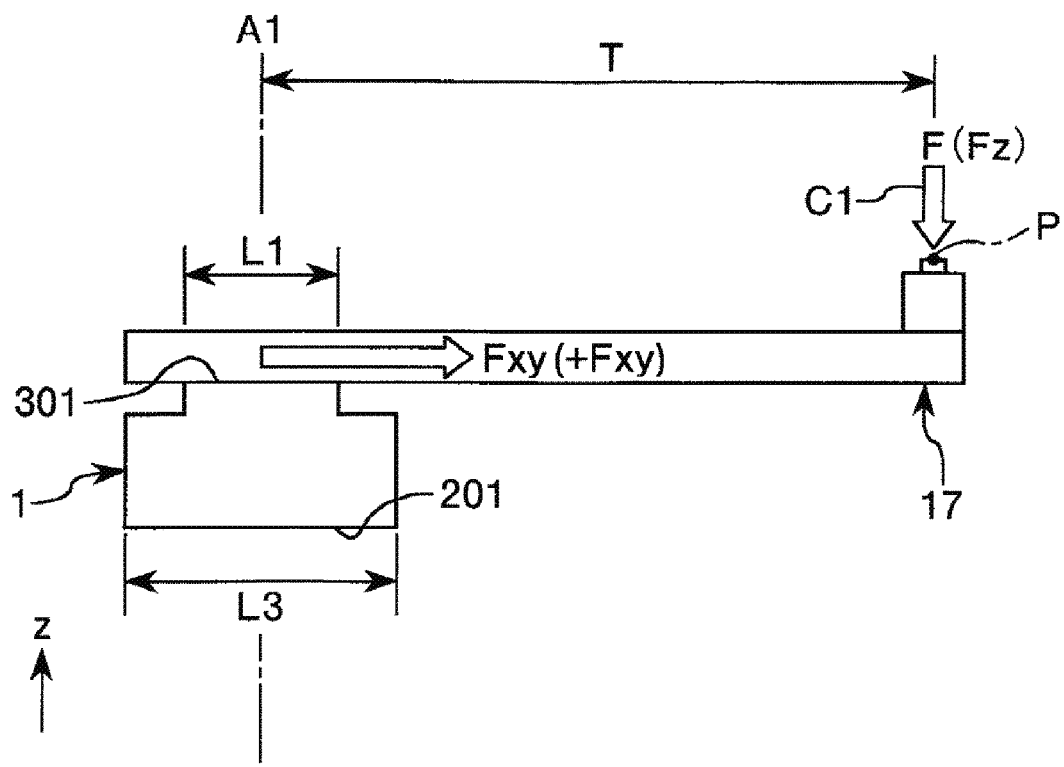
FIG. 9 is a side view schematically showing a state in which the force detecting device shown in FIG. 2 is attached to the end effector.
Figure 10:
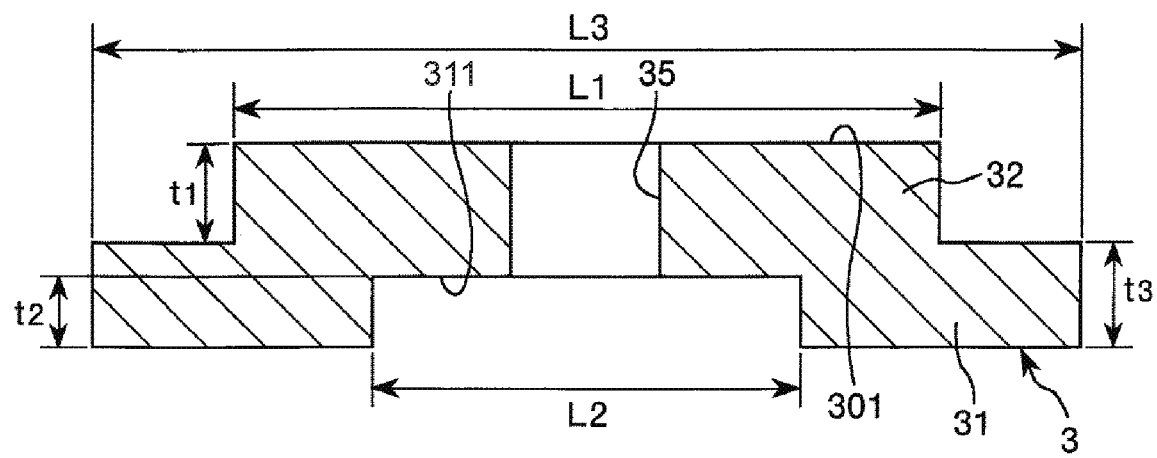
FIG. 10 is a longitudinal sectional view of a first member included in the force detecting device shown in FIG. 2.
Figure 11:
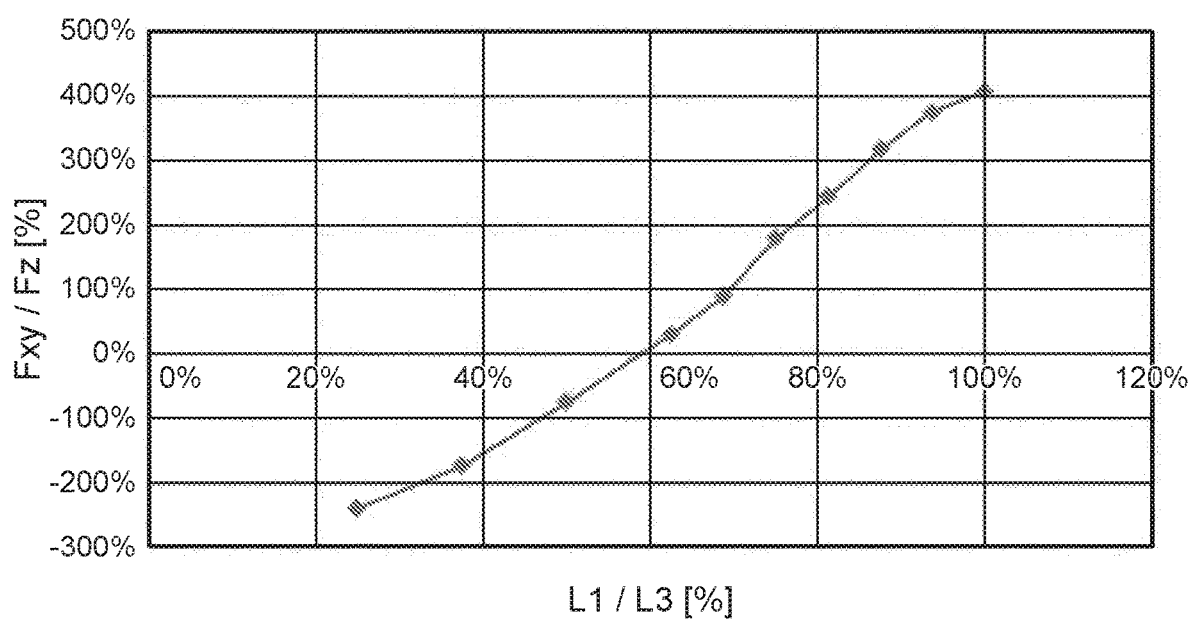
FIG. 11 is a diagram showing the influence of the width of a projecting section in the force detecting device shown in FIG. 9.

FIG. 9 is a side view schematically showing a state in which the force detecting device shown in FIG. 2 is attached to the end effector. FIG. 10 is a longitudinal sectional view of the first member included in the force detecting device shown in FIG. 2. FIG. 11 is a diagram showing the influence of the width of the projecting section in the force detecting device shown in FIG. 9.

FIG. 11 shows the magnitude of a translational force component Fxy at the time when width L1 (the diameter) of the projecting section 32 is changed while width L3 (the diameter) of the first member 3 shown in FIG. 10 is kept constant. The vertical axis in FIG. 11 indicates a ratio Fxy/Fz of the translational force component Fxy, which is output from the force detecting device 1 when the external force F in the arrow C1 direction is applied to the work part P of the end effector 17 as shown in FIG. 9, to the translational force component Fz. As the ratio Fxy/Fz is closer to 0%, the translational force component Fxy is smaller. The horizontal axis of the graph shown in FIG. 11 indicates a ratio L1/L3 of the width L1 to the width L3.

Note that, in the force detecting device 1 shown in FIG. 9, the sensor device 4 located on the lower side of FIG. 4 is attached to the end effector 17 to be located on the near side of the paper surface in FIG. 9. That is, the end effector 17 projects to the right side in FIG. 4 of the force detecting device 1. A translational force component in a direction along an axis connecting the work part P and the center axis A1 is represented as Fxy (a component having the translational force components Fx and Fy) (see FIG. 9). A point on the center axis A1 is represented as a zero point, the translational force component Fxy further toward the right side in FIG. 9 than the zero point is represented as + (plus), and the translational force component further toward the left side in FIG. 9 than the zero point is represented as − (minus).

As shown in FIG. 11, the ratio Fxy/Fz linearly changes according to the ratio L1/L3. That is, when the width L1 is changed, the magnitude of the translational force component Fxy changes according to the width L1. When the ration L1/L3 is 100%, that is, when the first member 3 does not include the projecting section 32, the translational force component Fxy is the largest. Since the first member 3 includes the projecting section 32, compared with when the first member 3 does not include the projecting section 32, it is possible to reduce the ratio Fxy/Fz. That is, it is possible to reduce the translational force component Fxy by providing the projecting section 32.

It is possible to reduce the translational force component Fxy (+Fxy) as the width L1 decreases until the ratio Fxy/Fz reaches approximately 60%. On the other hand, when the ratio Fxy/Fz exceeds approximately 60%, the translational force component Fxy (−Fxy) increases as the width L1 decreases. Such a tendency is considered to be caused by deformation (displacement) received by the force detecting device 1 (in particular, the wall sections 33a and 33c of the first member 3) when the external force F in the arrow C1 direction in FIG. 9 is applied to the force detecting device 1. This point is explained below mainly with reference to FIGS. 9 and 12 to 17.

Figure 12:
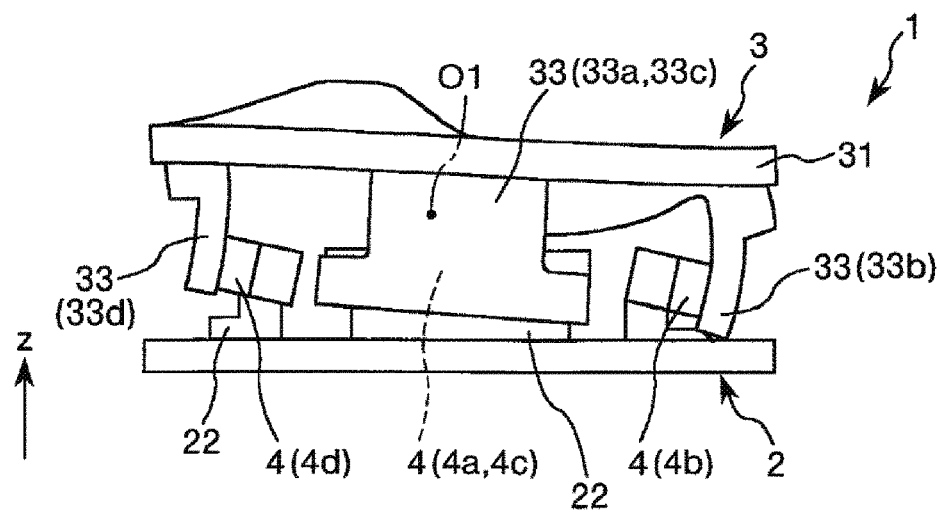
FIG. 12 is a diagram schematically showing a deformed state of the force detecting device at the time when L1/L3 shown in FIG. 11 is 25%.
Figure 13:
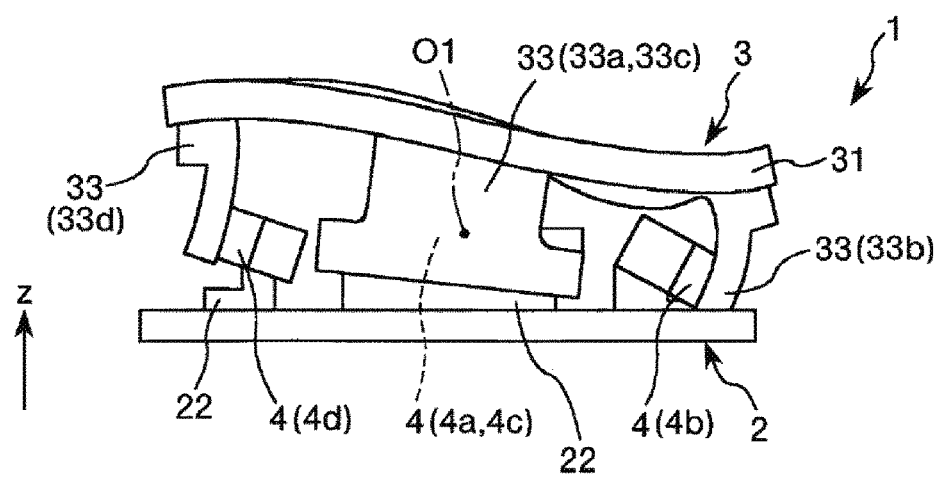
FIG. 13 is a diagram schematically showing a deformed state of the force detecting device at the time when L1/L3 shown in FIG. 11 is 63%.
Figure 14:
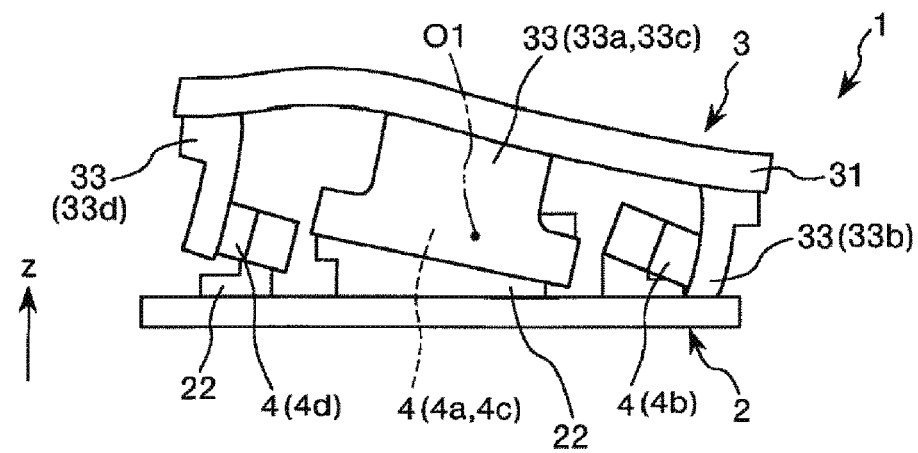
FIG. 14 is a diagram schematically showing a deformed state of the force detecting device at the time when L1/L3 shown in FIG. 11 is 100%.
Figure 15:
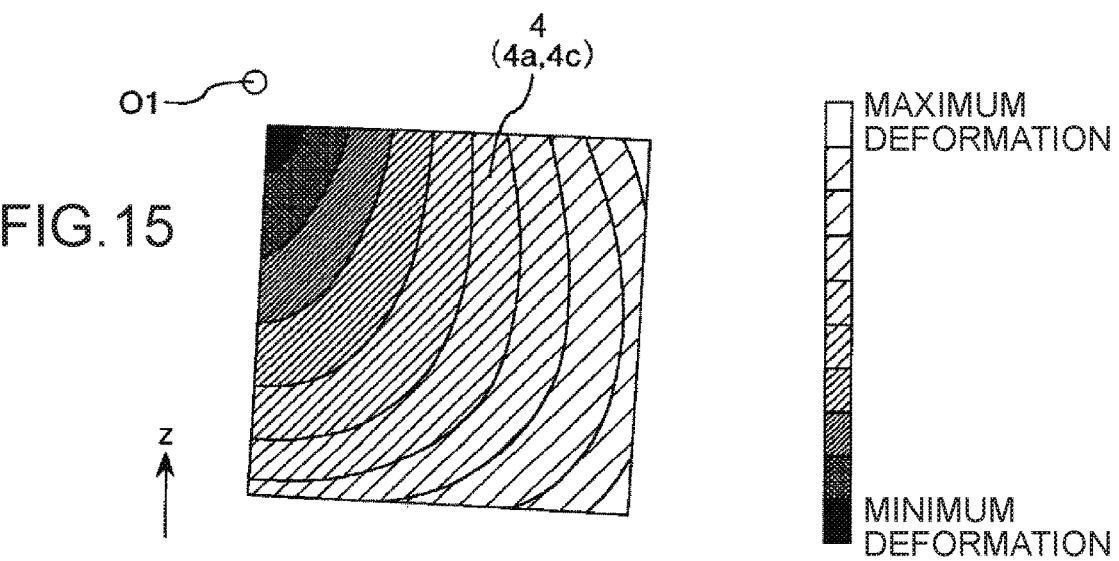
FIG. 15 is a diagram for explaining a rotation center of a force applied to a sensor unit at the time when L1/L3 shown in FIG. 11 is 25%.
Figure 16:
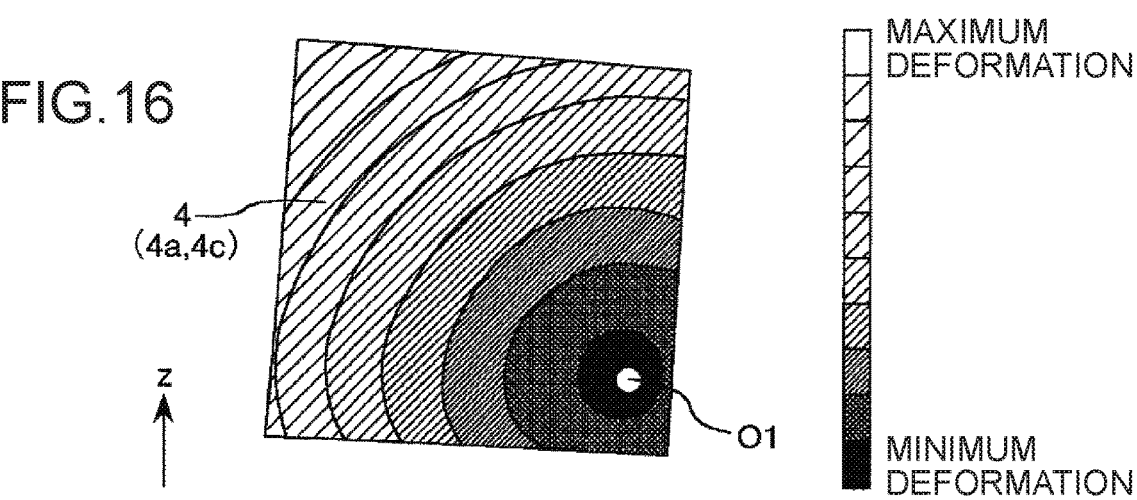
FIG. 16 is a diagram for explaining a rotation center of a force applied to the sensor unit at the time when L1/L3 shown in FIG. 11 is 63%.
Figure 17:
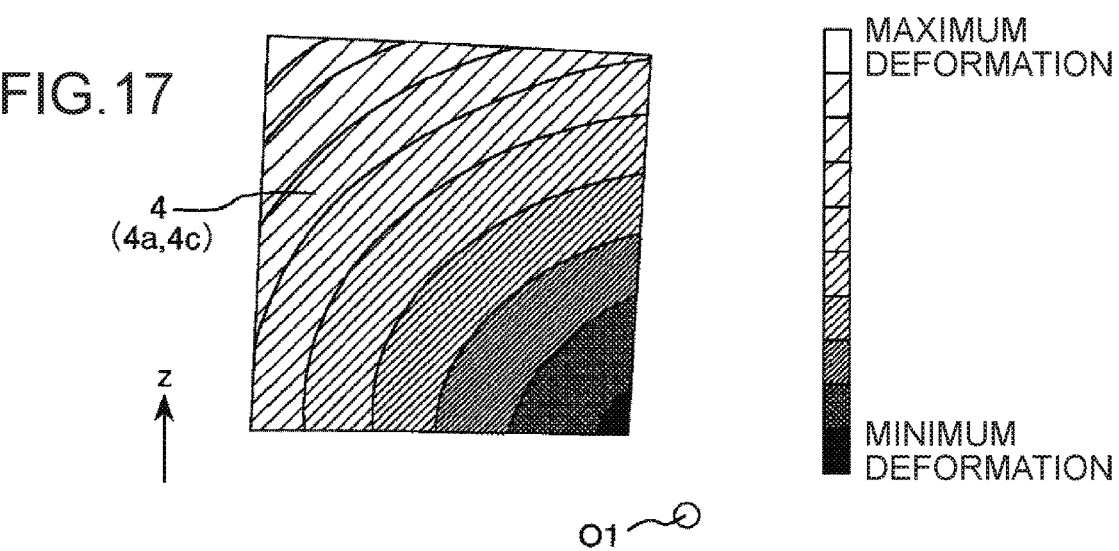
FIG. 17 is a diagram for explaining a rotation center of a force applied to the sensor unit at the time when L1/L3 shown in FIG. 11 is 100%.

FIG. 12 is a diagram schematically showing a deformed state of the force detecting device at the time when L1/L3 shown in FIG. 11 is 25%. FIG. 13 is a diagram schematically showing a deformed state of the force detecting device at the time when L1/L3 shown in FIG. 11 is 63%. FIG. 14 is a diagram schematically showing a deformed state of the force detecting device at the time when L1/L3 shown in FIG. 11 is 100%. FIG. 15 is a diagram for explaining a rotation center of a force applied to the sensor unit at the time when L1/L3 shown in FIG. 11 is 25%. FIG. 16 is a diagram for explaining a rotation center of a force applied to the sensor unit at the time when L1/L3 shown in FIG. 11 is 63%. FIG. 17 is a diagram for explaining a rotation center of a force applied to the sensor unit at the time when L1/L3 shown in FIG. 11 is 100%. Note that, in FIGS. 12 and 13, illustration of the projecting section 32 is omitted.

As shown in FIGS. 12 to 14, a way of deformation of the first member 3 (the force detecting device 1) is different depending on the magnitude of the ratio L1/L3. The first member 3 is deformed (displaced) with an axis O1 as the center axis when the external force F is applied to the first member 3 (see FIGS. 9 and 12 to 14). The axis O1 is an axis orthogonal to both of an axis connecting the work part P and the center axis A1 (or an axis along an extending direction of the end effector 17) and the center axis A1 (or an axis along the direction of the external force F).

The position of the axis O1 is different depending on the magnitude of the ratio L1/L3 as shown in FIGS. 12 to 14. The position of the axis O1 is located further on the upper side in the force detecting device 1 as the ratio L1/L3 decreases, that is, a contact area of the end effector 17 and the force detecting device 1 decreases.

Specifically, as shown in FIG. 17, when the ratio L1/L3 is 100%, the axis O1 is located on the outside of the sensor devices 4a and 4c (at the lower right in FIG. 17). When the width L1 is reduced from this state, the axis O1 approaches the sensor devices 4a and 4c. As shown in FIG. 16, for example, when the ratio L1/L3 is 68%, the axis O1 is located on the inside of the sensor devices 4a and 4c. When the width L1 is further reduced from this state, the axis O1 traverses the sensor devices 4a and 4c toward the left upper side in FIG. 16. As shown in FIG. 15, for example, when the ratio L1/L3 is 25%, the position of the axis O1 is located on the outside of the sensor devices 4a and 4c (at the upper left in FIG. 15). Note that, when the ratio L1/L3 is 25%, the axis O1 is located closer to the sensor devices 4a and 4c than when the ratio L1/L3 is 100%. In this way, the position of the axis O1 changes according to the magnitude of the ratio L1/L3.

Note that, when the ratio L1/L3 is 100%, a force is applied most to a portion closest to the work part P in an upper part of the first member 3 when the external force F is applied (see FIGS. 6 and 14). Consequently, according to the deformation of the end effector 17, a portion close to the work part P in the upper part of the first member 3 is pushed downward. The first member 3 is deformed clockwise such that a portion far from the work part P in the upper part of the first member 3 rises. On the other hand, when the ratio L1/L3 is 68% or 25%, when the external force F is applied, a force is applied most to a portion closest to the work part P on the upper surface 301 of the projecting section 32 (see FIGS. 9, 12, and 13). Consequently, according to the deformation of the end effector 17, the portion closest to the work part P on the upper surface 301 of the projecting section 32 is pushed downward. The first member 3 is deformed clockwise such that a portion most distant from the work part P on the upper surface 301 of the projecting section 32 rises. When the ratio L1/L3 is 25%, the first member 3 is considered to be deformed counterclockwise as well. This is because, when the ratio L1/L3 is 25%, the area of the upper surface 301 functioning as the attachment surface decreases as the width L1 decreases and stability of attachment of the force detecting device 1 to the end effector 17 is deteriorated.

In this way, by providing the projecting section 32 and adjusting the width L1 (the area of the upper surface 301), it is possible to locate the axis O1 on the inside of the sensor devices 4a and 4c. Consequently, it is possible to reduce a deformation amount along an axial direction connecting the work part P and the center axis A1 in the wall sections 33a and 33c. According to the reduction of the deformation amount, it is possible to reduce a deformation amount along an axial direction connecting the work part P and the center axis A1 in the sensor devices 4a and 4c (see FIGS. 12 to 17). Therefore, it is possible to reduce the translational force component Fxy output from the force detecting device 1 by the external force F explained above.

In this embodiment, as explained above, the sensor devices 4 are disposed to be symmetrical with respect to the line segment CL, the stacking direction D1 of the piezoelectric elements 5 is orthogonal to the center axis A1, and the calculation of the translational force components Fx, Fy, and Fz and the rotational force components Mx, My, and Mz is performed without using the electric charge QZ (see FIGS. 4 and 5). Therefore, deformation (displacement) along the axial direction connecting the work part P of the first member 3 and the center axis A1 particularly affects output values of the electric charges QX and QY output from the sensor devices 4a and 4c. Therefore, as explained above, by reducing the deformation amount along the axial direction connecting the work part P and the center axis A1 in the sensor devices 4a and 4c, it is possible to suppress the translational force component Fxy output from the force detecting device 1 when the external force F is received.

Note that, when the thickness (the height) of the projecting section 32, the length of the axis connecting the work part P and the center axis A1 (a clearance T), the magnitude of the external force F, and the like were changed, the same tendency as the tendency shown in FIG. 11 was shown. By locating the axis O1 within an x-y plane including the sensor devices 4, it is possible to reduce the other axis output (in this embodiment, the translational force component Fxy).

The ratio L1/L3 is desirably 35% or more and 75% or less (see FIG. 11). Consequently, it is possible to set the ratio Fxy/Fz to approximately ±200%. That is, it is possible to halve the translational force component Fxy compared with when the first member 3 does not include the projecting section 32. Further, the ratio L1/L3 is more desirably 50% or more and 70% or less and still more desirably 55% or more and 65% or less. Consequently, it is possible to more stably attach the force detecting device 1 to the end effector 17 and further reduce the translational force component Fxy.

In this embodiment, when the ratio L1/L3 is 75% or less, the projecting section 32 is located further on the inner side than the plurality of sensor devices 4 in plan view. In other words, the width L1 of the projecting section 32 is smaller than the clearance between the two sensor devices 4 opposed to each other (e.g., the sensor device 4b and the sensor device 4d). By locating the projecting section 32 in this way, it is possible to halve the translational force component Fxy compared with when the first member 3 does not include the projecting section 32.

As explained above, the force detecting device 1 is the force detecting device 1 attachable to the robot 100 including the arm 16 (see FIG. 1). The force detecting device 1 includes the first member 3 including the projecting section 32 having the upper surface 301 functioning as the "attachment surface" to which the end effector 17 functioning as the "member to be attached" is attachable, the second member 2 attached to the arm 16, and at least one (desirably the plurality of) piezoelectric element(s) 5 (the force detecting element 41) supported (held) between the first member 3 and the second member 2 and configured to detect an external force (the external force F) applied to the first member 3 and the second member 2 (see FIGS. 3 to 5). In this embodiment, the projecting section 32 projects to the opposite side of the second member 2. With the force detecting device 1, even when the external force F is applied to a position deviating from the center axis A1, it is possible to reduce the other axis output (in FIG. 10, the translational force component Fxy) and improve the detection accuracy of the external force F by the force detecting device 1. Therefore, with the force detecting device 1, it is possible to improve the detection accuracy of the external force F by the force detecting device 1 both when the external force F is applied to a position deviating from the center axis A1 of the force detecting device 1 and when the external force F is applied to a position on the center axis A1 of the force detecting device 1.

As explained above, the force detecting device 1 includes the plurality of sensor devices 4 held by the first member 3 and the second member 2 and including at least one piezoelectric element 5 (in this embodiment, the plurality of piezoelectric elements 5). The projecting section 32 is located further on the inner side than the plurality of sensor devices 4 in plan view, that is, when viewed from the normal direction of the upper surface 301 functioning as the "attachment surface". Consequently, even when the external force F is applied to a position deviating from the center axis A1 of the force detecting device 1, it is possible to further reduce the other axis output and further improve the detection accuracy of the external force F by the force detecting device 1. In particular, as explained above, it is possible to halve the other axis output (in FIG. 10, the translational force component Fxy) compared with when the first member 3 does not include the projecting section 32.

As explained above, in this embodiment, the force detecting device 1 is attached to the end effector 17. In other words, the "member to be attached" to which the upper surface 301 functioning as the attachment surface of the force detecting device 1 is attached is the end effector 17. Consequently, it is possible to highly accurately detect, with the force detecting device 1, the external force F received by the end effector 17. Therefore, the robot 100 can more highly accurately perform, for example, work on an object by the end effector 17.

In particular, as explained above, the work part P of the end effector 17 deviates from the center axis A1 and is eccentric to the force detecting device 1 (and the arm 16). That is, the work part P of the end effector 17 deviates from the normal of the upper surface 301 that passes the center (the geometrical center) of the upper surface 301 functioning as the "attachment surface". It is particularly effective to use the force detecting device 1 for the end effector 17. Even in such an end effector 17, with the force detecting device 1, it is possible to reduce the other axis output and improve the detection accuracy of the external force F. For example, the end effector 17 can be configured to include, at the distal end portion of the end effector 17, a driver that performs screwing. In the case of the end effector 17 (an eccentric end effector) including the driver, it is particularly effective to use the force detecting device 1. It is possible to highly accurately perform the screwing by the driver by using the force detecting device 1.

It is possible to achieve a reduction in the weight of the first member 3 and reduce the other axis output of the force detecting device 1 because the first member 3 includes the recessed section 311. This is explained mainly with reference to FIGS. 18 and 19.

Figure 18:
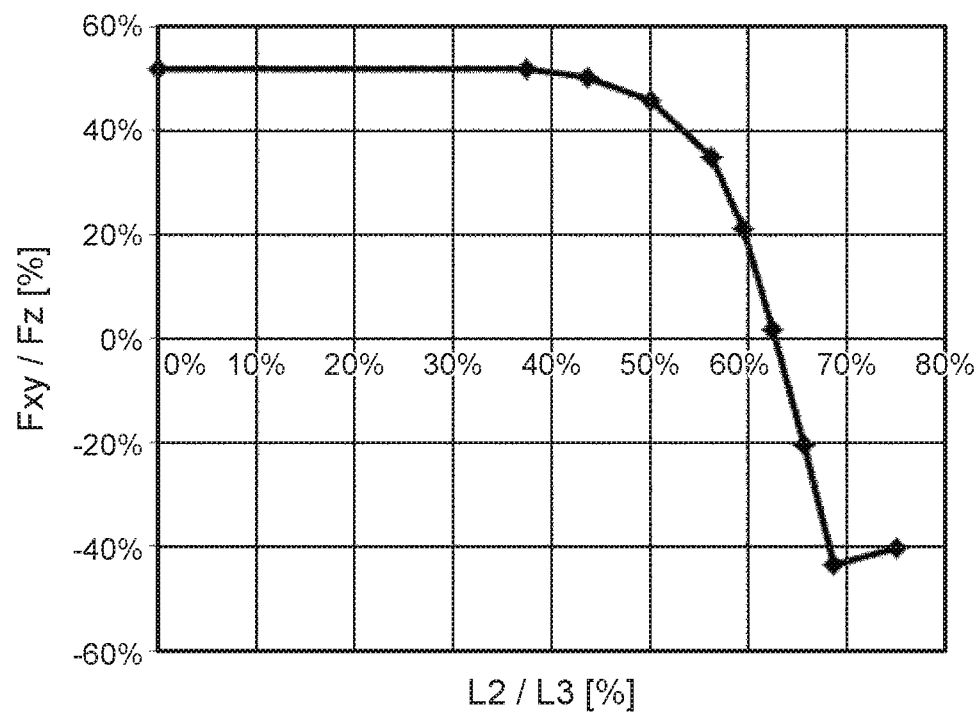
FIG. 18 is a diagram showing the influence of the width of a recessed section of the first member shown in FIG. 10.
Figure 19:
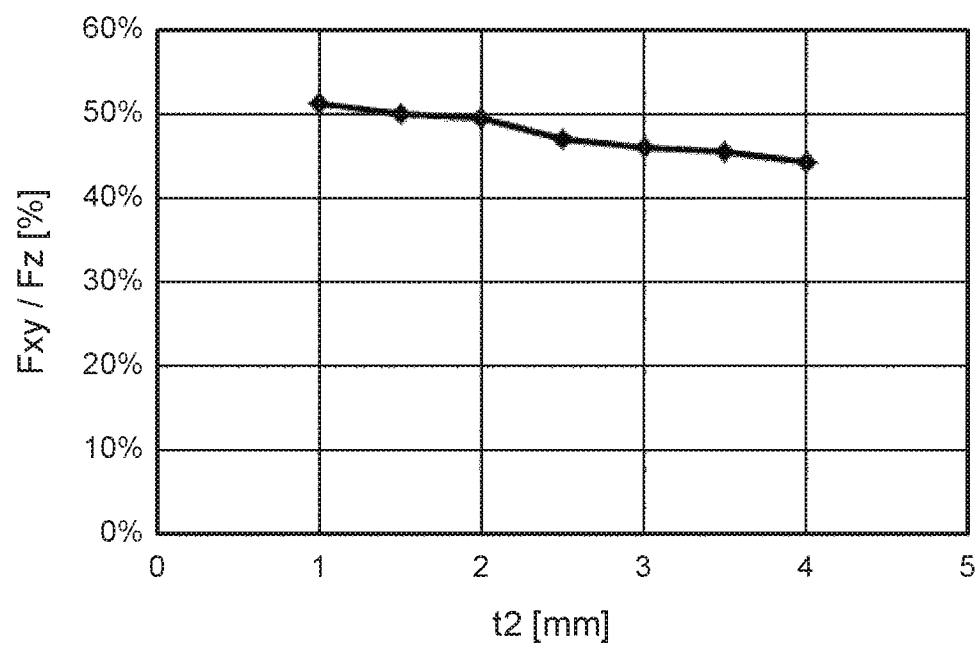
FIG. 19 is a diagram showing the influence of the height of the recessed section of the first member shown in FIG. 10.

FIG. 18 is a diagram showing the influence of the width of the recessed section of the first member shown in FIG. 10. FIG. 19 is a diagram showing the influence of the height of the recessed section of the first member shown in FIG. 10.

FIG. 18 shows the magnitude of the translational force component Fxy at the time when width L2 (the diameter) of the recessed section 311 is changed while width L3 of the first member 3 shown in FIG. 10 is kept constant. In FIG. 18, the first member 3 is used in which, for example, the width L3 is 80 mm, the width L1 is 55 mm, the height of the first member 3 is 6 mm, height t3 of the top plate 31 is 5 mm, height t1 of the projecting section 32 is 1 mm, the ratio L1/L3 is 68.75%.

As shown in FIG. 18, when the width L2 of the recessed section 311 changed with respect to the width L3 of the first member 3, the magnitude of the translational force component Fxy changes. In this way, it is also possible to adjust the size of the width L3 to reduce the translational force component Fxy in addition to adjusting the size of the width L2. Consequently, it is possible to secure the size of the width L2 to a certain degree. Therefore, it is possible to increase the width L3 of the recessed section 311 to achieve a reduction in the weight of the first member 3 while increasing the area of the upper surface 301 functioning as the attachment surface and sufficiently securing stability of attachment of the force detecting device 1 to the end effector 17. Therefore, for example, it is also suitable to set the ratio L1/L3 shown in FIG. 11 to 60% or more and 80% or less and set a ratio L2/L3 to 53% or more and 70% or less. Consequently, it is possible to achieve a reduction in the weight of the first member 3 and more conspicuously exhibit an effect that the translational force component Fxy can be further reduced.

As explained above, the first member 3 includes the recessed section 311 on the opposite side of the projecting section 32. Consequently, it is possible to achieve a reduction in the weight of the first member 3, further reduce the other axis output, and further improve the detection accuracy of the external force F.

FIG. 19 shows the magnitude of the translational force component Fxy at the time when height t2 (the thickness) of the recessed section 311 is changed while the width L3 of the first member 3 shown in FIG. 10 is kept constant. As shown in FIG. 19, even if the height t2 (the thickness) is changed within a range of height equal to or smaller than the height of the top plate 31, the translational force component Fxy does not greatly change. Therefore, it is possible to achieve a further reduction in the weight of the first member 3 while exhibiting an effect that the translational force component Fxy is reduced by increasing the height t2 (the thickness) within the range of the height equal to or smaller than the height of the top plate 31.

Second Embodiment

Figure 20:
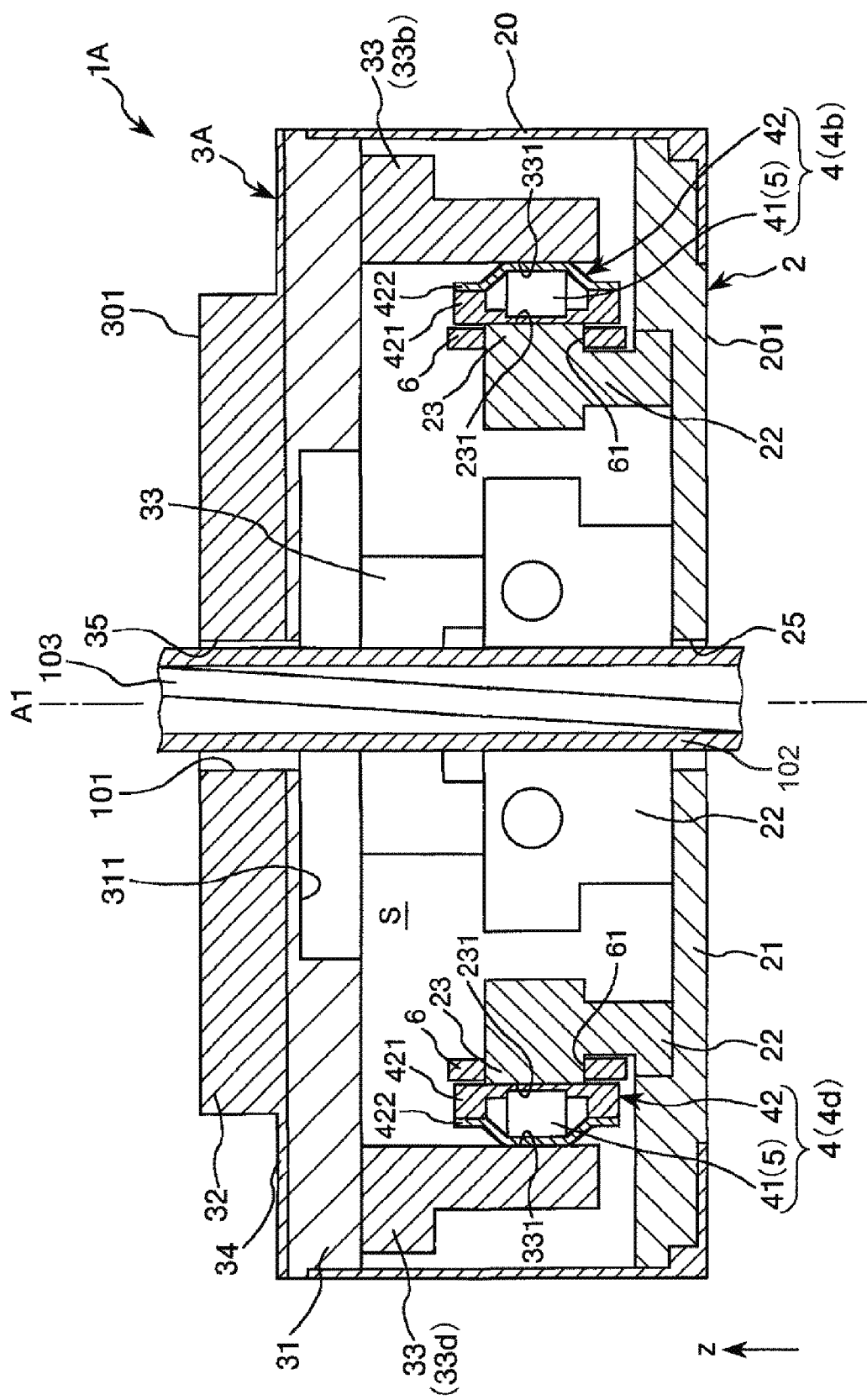
FIG. 20 is a longitudinal sectional view showing a force detecting device included in a robot according to a second embodiment of the invention.

FIG. 20 is a longitudinal sectional view showing a force detecting device included in a robot according to a second embodiment of the invention. Note that, in the following explanation, concerning the second embodiment, differences from the first embodiment are mainly explained. Explanation concerning similarities to the first embodiment is omitted. In FIG. 20, the same components as the components in the first embodiment are denoted by the same reference numerals and signs.

A first member 3A included in a force detecting device 1A shown in FIG. 20 includes the top plate 31, a member 34 including the projecting section 32, and the plurality of wall sections 33 (the first pressurizing section). A portion excluding the projecting section 32 of the member 34 is a substantially flat shape and is provided detachably attachable to the top plate 31. Consequently, it is easy to change the member 34 to the member 34 including the projecting section 32 having a desired shape and desired size. For example, it is possible to simply change the member 34 to the member 34 corresponding to, for example, a type of the end effector 17.

Note that the member 34 may be fixed to the top plate 31 without being able to be attached and detached. In the figure, the external shape in plan view of the portion excluding the projecting section 32 of the member 34 is the same shape as the top plate 31. However, the external shape may be a shape different from the top plate 31.

With the force detecting device 1A as well, it is possible to improve detection accuracy of an external force (the external force F).

Third Embodiment

Figure 21:
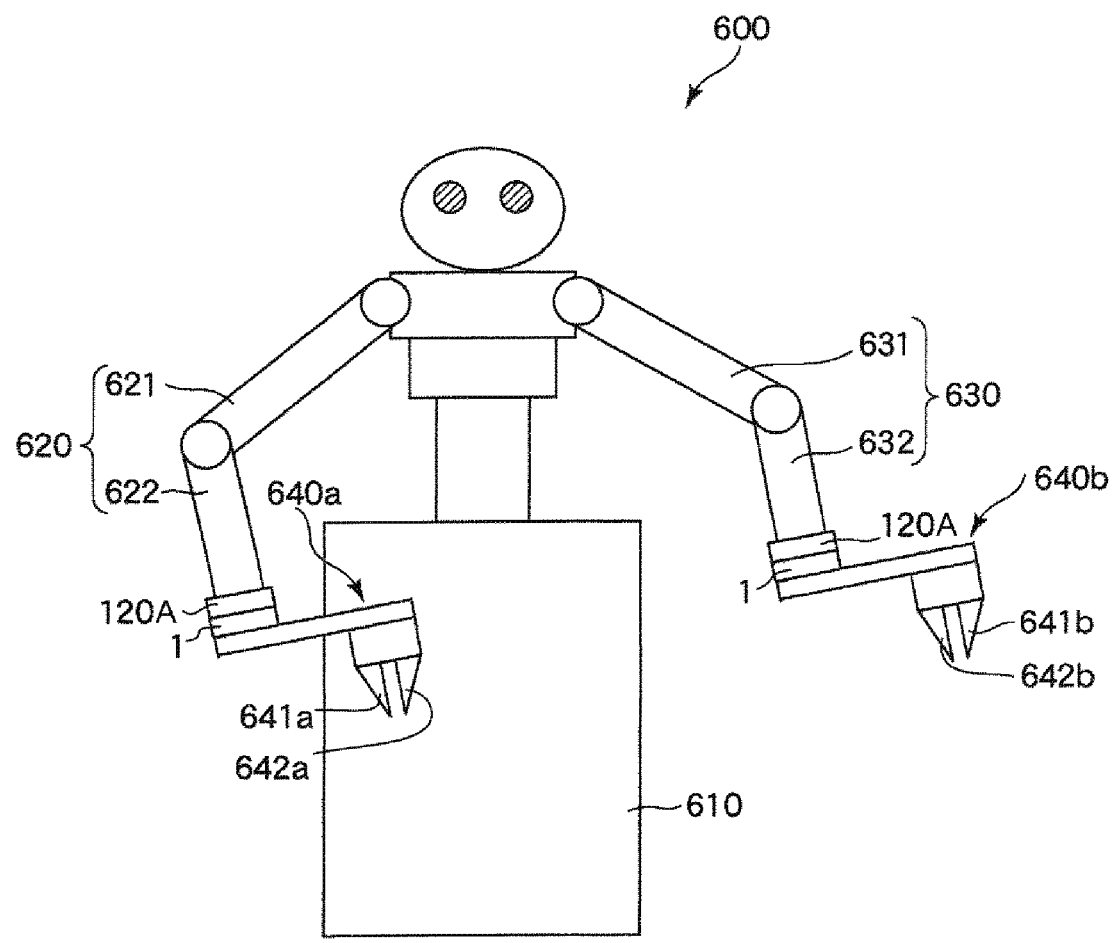
FIG. 21 is a perspective view showing a robot according to a third embodiment of the invention.

FIG. 21 is a perspective view showing a robot according to a third embodiment of the invention. Note that, in the following explanation, concerning the third embodiment, differences from the embodiments explained above are mainly explained. Explanation of similarities to the embodiments explained above is omitted. In FIG. 21, the same components as the components in the embodiments explained above are denoted by the same reference numerals and signs.

A robot 600 shown in FIG. 21 is a double-arm robot and includes a base 610, a first robot arm 620, a second robot arm 630, a first end effector 640*a* provided on the distal end side of the first robot arm 620, a second end effector 640*b* provided on the distal end side of the second robot arm 630, and two force detecting devices 1.

The first robot arm 620 includes an arm 621 (a first arm) and an arm 622 (a second arm). The first robot arm 620 is configured by turnably coupling the arms 621 and 622. The force detecting device 1 (or the force detecting device 1A) is connected to the distal end of the arm 622 by an attachment member 120A (an adapter). The first end effector 640*a* is connected to the distal end of the force detecting device 1. The first end effector 640*a* includes two fingers 641*a* and 642*a* that grip an object.

Similarly, the second robot arm 630 includes an arm 631 (a first arm) and an arm 632 (a second arm). The second robot arm 630 is configured by turnably coupling the arms 631 and 632. The force detecting device 1 (or the force detecting device 1A) is connected to the distal end of the arm 632 by the attachment member 120A (the adapter). A second end effector 640*b* is connected to the distal end of the force detecting device 1. The second end effector 640*b* includes two fingers 641*b* and 642*b* that grip an object.

Since the robot 600 includes the force detecting device 1, it is possible to detect external forces applied to the first end effector 640*a* and the second end effector 640*b*. Therefore, by feeding back the external forces detected by the detecting device 1 to a control section (not shown in the figure) having a function of controlling the robot 600, the robot 600 can more precisely execute work. The robot 600 can detect, with the forces detected by the force detecting device 1, for example, contact of the first end effector 640a and the second end effector 640b with obstacles. Therefore, it is possible to easily perform an obstacle avoiding motion, an object damage avoiding motion, and the like. The robot 600 can more safely execute work.

Note that, in the configuration shown in the figure, the numbers of robot arms and arms included in the robot 600 are not limited to the numbers shown in the figure. For example, the number of robot arms may be three or more. The number of arms included in one robot arm may be one or may be three or more.

The force detecting device and the robot according to the invention are explained above on the basis of the embodiments shown in the figures. However, the invention is not limited to this. The components of the sections can be replaced with any components having the same functions. Any other components may be added to the invention. The invention may be a combination of any two or more components (features) in the embodiments.

The force detecting device may be provided between the arm and the arm (the member to be attached). The package included in the sensor device may be omitted. The stacking direction of the piezoelectric elements is not limited to the stacking direction shown in the figure. The pressurizing bolts have only to be provided according to necessity and may be omitted.

The robot according to the invention may be other robots such as a SCARA robot.

The force detecting device according to the invention can also be incorporated in an apparatus other than the robot and, for example, may be mounted on a mobile body such as an automobile.

The entire disclosure of Japanese Patent Application No. 2017-013481, filed Jan. 27, 2017 is expressly incorporated by reference herein.

What is claimed is:

1. A force detecting device attachable to a robot including an arm, the force detecting device comprising:
a first base including a projection having an attachment surface to which an end effector is attachable, the first base including a recess in the projection on a surface opposite the attachment surface, a diameter of the recess being less than a diameter of the projection;
a second base attached to the arm; and
at least one piezoelectric element supported between the first base and the second base and configured to detect external forces applied to the first base and the second base, the at least one piezoelectric element being arranged such that a normal of the attachment surface and a stacking direction of the at least one piezoelectric element are orthogonal,
wherein the at least one piezoelectric element is supported between a first wall engaged with an inside surface of the first base and extending parallel to the normal of the attachment surface and a second wall engaged with an inside surface of the second base and extending parallel to the normal of the attachment surface, and
the second wall is positioned within a recess in the inside surface of the second base.

2. The force detecting device according to claim 1, wherein the force detecting device includes a plurality of the piezoelectric elements.

3. The force detecting device according to claim 2, further comprising a plurality of sensor devices held by the first base and the second base and including the at least one piezoelectric element, wherein
when viewed from a normal direction of the attachment surface, the projection is located further on an inner side than the plurality of sensor devices.

4. The force detecting device according to claim 1, wherein the first base includes a recess on an opposite side of the projection.

5. The force detecting device according to claim 1, wherein
the first base includes a first wall configured to pressurize the piezoelectric element, and
the second base includes a second wall configured to pressurize the piezoelectric element.

6. The force detecting device according to claim 1, wherein the piezoelectric element includes quartz.

7. The force detecting device according to claim 1, further comprising a through-hole opened in the first base and the second base.

8. The force detecting device according to claim 1, wherein the second base is configured to enable an adapter for attaching the second base to the arm to be connected to the second base.

9. The force detecting device according to claim 1, wherein a work part of the end effector deviates from a normal of the attachment surface that passes a center of the attachment surface.

10. A robot comprising:
an arm; and
a force detecting device attached to the arm,
wherein the force detecting device includes a first base including a projection having an attachment surface to which an end effector is attachable, a second base attached to the arm, and at least one piezoelectric element supported between the first base and the second base and configured to detect external forces applied to the first base and the second base,
wherein the first base includes a recess in the projection on a surface opposite the attachment surface, a diameter of the recess being less than a diameter of the projection,
wherein the at least one piezoelectric element is arranged such that a normal of the attachment surface and a stacking direction of the at least one piezoelectric element are orthogonal,
wherein the at least one piezoelectric element is supported between a first wall engaged with an inside surface of the first base and extending parallel to the normal of the attachment surface and a second wall engaged with an inside surface of the second base and extending parallel to the normal of the attachment surface, and
the second wall is positioned within a recess in the inside surface of the second base.

11. The robot according to claim 10,
wherein the force detecting device includes a plurality of the piezoelectric elements.

12. The robot according to claim 10,
wherein the force detecting device includes a plurality of sensor devices held by the first base and the second base and including the at least one piezoelectric element, and
when viewed from a normal direction of the attachment surface, the projection is located further on an inner side than the plurality of sensor devices.

13. The robot according to claim 10,
wherein the first base includes a recess on an opposite side of the projection.

14. The robot according to claim 10,
wherein the first base includes a first wall configured to pressurize the piezoelectric element, and
the second base includes a second wall configured to pressurize the piezoelectric element.

15. The robot according to claim 10,
wherein the piezoelectric element includes quartz.

16. The robot according to claim 10,
wherein the force detecting device includes a through-hole opened in the first base and the second base.

17. The robot according to claim 10,
wherein the second base is configured to enable an adapter for attaching the second base to the arm to be connected to the second base.

18. The robot according to claim 10,
wherein a work part of the end effector deviates from a normal of the attachment surface that passes a center of the attachment surface.

\* \* \* \* \*